(12) United States Patent
Tsuji

(10) Patent No.: US 7,224,481 B2
(45) Date of Patent: May 29, 2007

(54) IMAGE FORMING APPARATUS HAVING PLURAL IMAGE SUPPORTING BODIES

(75) Inventor: Hiroyuki Tsuji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 10/285,459

(22) Filed: Nov. 1, 2002

(65) Prior Publication Data

US 2003/0090637 A1 May 15, 2003

(30) Foreign Application Priority Data

Nov. 9, 2001 (JP) ............................ 2001-345034
Oct. 31, 2002 (JP) ............................ 2002-317719

(51) Int. Cl.
*G06K 15/00* (2006.01)

(52) U.S. Cl. ...................... 358/1.16; 358/498
(58) Field of Classification Search ................. 358/1.1, 358/1.5, 1.9, 1.12, 1.18
See application file for complete search history.

(56) References Cited

U.S. PATENT DOCUMENTS

| | | | |
|---|---|---|---|
| 4,521,805 A | 6/1985 | Ayata et al. .................. 358/75 |
| 4,660,077 A | 4/1987 | Kawamura et al. ........... 358/75 |
| 5,028,992 A * | 7/1991 | Arai ............................ 358/540 |
| 5,715,498 A | 2/1998 | Takeuchi et al. .............. 399/40 |
| 5,828,937 A | 10/1998 | Aerens et al. ............... 399/301 |
| 5,964,540 A | 10/1999 | Shiina et al. ................ 400/149 |
| 6,483,603 B1 * | 11/2002 | Yonenaga .................... 358/1.16 |

* cited by examiner

*Primary Examiner*—Gabriel I. Garcia
(74) *Attorney, Agent, or Firm*—Fitzpatrick, Cella, Harper & Scinto

(57) ABSTRACT

In a color printer having plural photosensitive drums for respective recording color components, when images are continuously formed on recording sheets, lengths of image data of one page in its main scan direction and its sub scan direction are held for plural pages. Then, image data writing and reading addresses to and from a delay memory for delaying the image data according to an inter-drum distance are controlled for each page on the basis of the held lengths of the image data in its main scan direction and its sub scan direction, whereby an interval between the successively transported recording sheets is shortened.

3 Claims, 20 Drawing Sheets

FIG. 20

| 0 | 1 | 2 | 3 | - | X-1 |
|---|---|---|---|---|---|
| X | X+1 | - | - | - | |
| 2X | 2X+1 | - | - | - | |
| 3X | 3X+1 | - | - | - | |
| - | | | | | |
| - | | | | | |
| X(Ya-1) | | | | | XYa-1 |
| XYa | Xya+1 | - | - | - | |
| - | | | | | |
| - | | | | | |
| - | | | | | |
| - | | | | | |
| - | | | | | |
| - | | | | | |
| - | | | | | |
| - | | | | | XYa+Xyb-1 |
| XYa+XYb | - | - | - | - | |
| - | | | | | |
| - | | | | | |
| - | | | | | |
| - | | | | | |
| - | | | | | |

IMAGE FORMING APPARATUS HAVING PLURAL IMAGE SUPPORTING BODIES

BACKGROUND OF THE INVENTION

1. Field of the Invention

The present invention relates to an image forming apparatus which has, e.g., a photosensitive drum for each color and thus performs color printing.

2. Related Background Art

Conventionally, a so-called 1D (one-drum) printer which contains only one photosensitive drum and a so-called 4D (four-drum) printer (or tandem printer) which contains plural photosensitive drums have been widely known.

The 1D printer performs image formation of four colors of yellow (Y), magenta (M), cyan (C) and black (K) by rotating four times a transfer drum on which a medium called an intermediate transfer body or a sheet of paper (simply called a sheet hereinafter) is applied.

On the other hand, in the 4D printer, since the respective photosensitive drums of the four colors are provided independently, an image including four colors can be formed at a time. Therefore, if a sheet transportation speed is constant, the 4D printer can generally achieve a print speed four times as much as that of the 1D printer. However, as described above, the 4D printer is equipped with the plural photosensitive drums respectively arranged at predetermined intervals. Thus, in the 4D printer, after color image signals of red (R), green (G) and blue (B) read by a scanner or the like are subjected to a color process and then converted into color image signals of Y, M, C and K, it is necessary to delay the image signal for a time required to transport the sheet for the interval (distance) between the adjacent color photosensitive drums. For this reason, a delay memory to be used to delay the image signals is required. Here, it should be noted that the delay memory has a storage capacity according to the distance between the adjacent photosensitive drums.

On one hand, if the sheet transportation speed of the 4D printer is constant, it is necessary to shorten a so-called sheet (paper) interval which is the interval between the trailing edge of a preceding sheet and the leading edge of a succeeding sheet so as to increase the print speed.

In an apparatus which is called an MFP (Multifunction Peripheral), it is required to output through a printer image data obtained from various devices such as a scanner, a PC (personal computer), a FAX (facsimile device) and the like. In such a situation, in order to improve productivity of a system as a whole, it is required to continuously output through the printer the image data obtained from the various devices and respectively having different image sizes.

In this case, data writing and reading in unit of line to and from the delay memory are controlled on the basis of the length of a main-scan valid (or effective) interval signal corresponding to the length of the image data in a main scan direction and the length of a sub-scan valid (or effective) interval signal corresponding to the length of the image data in a sub scan direction.

However, since the conventional 4D printer is equipped merely with a single set of delay memories, even if a sheet size (image size) is changed while a series of recording operations is being performed, the main-scan valid interval signal and the sub-scan valid interval signal can not be changed until the delay memories become empty. Therefore, next data can not be stored in the delay memory until it becomes empty, and it is thus necessary to prolong the sheet interval. That is, the images respectively having the different sizes can not be simultaneously formed on the respective photosensitive drums of the four colors.

FIGS. 17A and 17B are diagrams showing the relations between the photosensitive drums and the image sizes. In FIGS. 17A and 17B, numerals 1701 and 1702 respectively denote photosensitive drums of which development colors are different from each other, numeral 1703 denotes a recording sheet (paper) P1 on which an output image of first page is recorded, numerals 1704 and 1705 respectively denote recording sheets P2 on which output images of second page are recorded, symbol d denotes an interval between the adjacent photosensitive drums, and symbol i denotes an interval between the trailing edge of the recording sheet P1 of the first page and the leading edge of the recording sheet P2 of the second page.

In FIG. 17A, the size of the recording sheet P1 of the first page is the same as the size of the recording sheet P2 of the second page, whereby the image data can be output at the short sheet interval even by using the conventional 4D printer. On the other hand, in FIG. 17B, the size of the recording sheet P1 of the first page is different from the size of the recording sheet P2 of the second page. Thus, in the above conventional 4D printer, as described above, the main-scan valid interval signal and the sub-scan valid interval signal can not be changed until the delay memories become empty, whereby the image data can not be output in the state that the sheet interval is being shortened. That is, it is necessary in this case to prolong the interval i between the trailing edge of the recording sheet P1 of the first page and the leading edge of the recording sheet P2 of the second page more than the interval d between the adjacent photosensitive drums. Incidentally, since the 4D printer contains the four photosensitive drums, the interval between the photosensitive drums at the both ends of the printer is three times the interval d between the adjacent photosensitive drums, whereby it is necessary to enlarge or prolong the sheet interval i more than three times the interval d.

SUMMARY OF THE INVENTION

An object of the present invention is to provide an image forming apparatus which eliminated such inconvenience as above, and to provide a control method of the above image forming apparatus.

Another object of the present invention is to provide an image forming apparatus which can shorten a sheet interval between transported successive sheets without any specific setting, by administrating main-scan direction lengths and sub-scan direction lengths of plural pages in case of controlling delay memories in a 4D printer, and to provide a control method of the above image forming apparatus.

Still another object of the present invention is to provide an image forming apparatus which can shorten a sheet interval between transported successive sheets without any specific setting, by administrating main-scan direction lengths according to a maximum size in case of controlling the delay memories in the 4D printer, and to provide a control method of the above image forming apparatus.

Still another object of the present invention is to provide an image forming apparatus which can shorten a sheet interval between transported successive sheets by storing a memory end address of each page in case of image data writing, even in a case where a sub-scan direction length of an image to be output is shorter than an interval between adjacent photosensitive drums and the sub-scan direction length for each page is different from others.

Other objects of the present invention will be apparent from the following explanation based on the attached drawings and the appended claims.

BRIEF DESCRIPTION OF THE DRAWINGS

FIG. 20 is a diagram showing an address map of an image delay memory according to the third embodiment.

DETAILED DESCRIPTION OF THE PREFERRED EMBODIMENTS

Hereinafter, the embodiments of the present invention concerning an image forming apparatus and an image forming method will be explained with reference to the accompanying drawings. Here, it should be noted that the image forming apparatus according to the embodiments of the present invention is applied to an MFP.

(First Embodiment)

Figure 1:
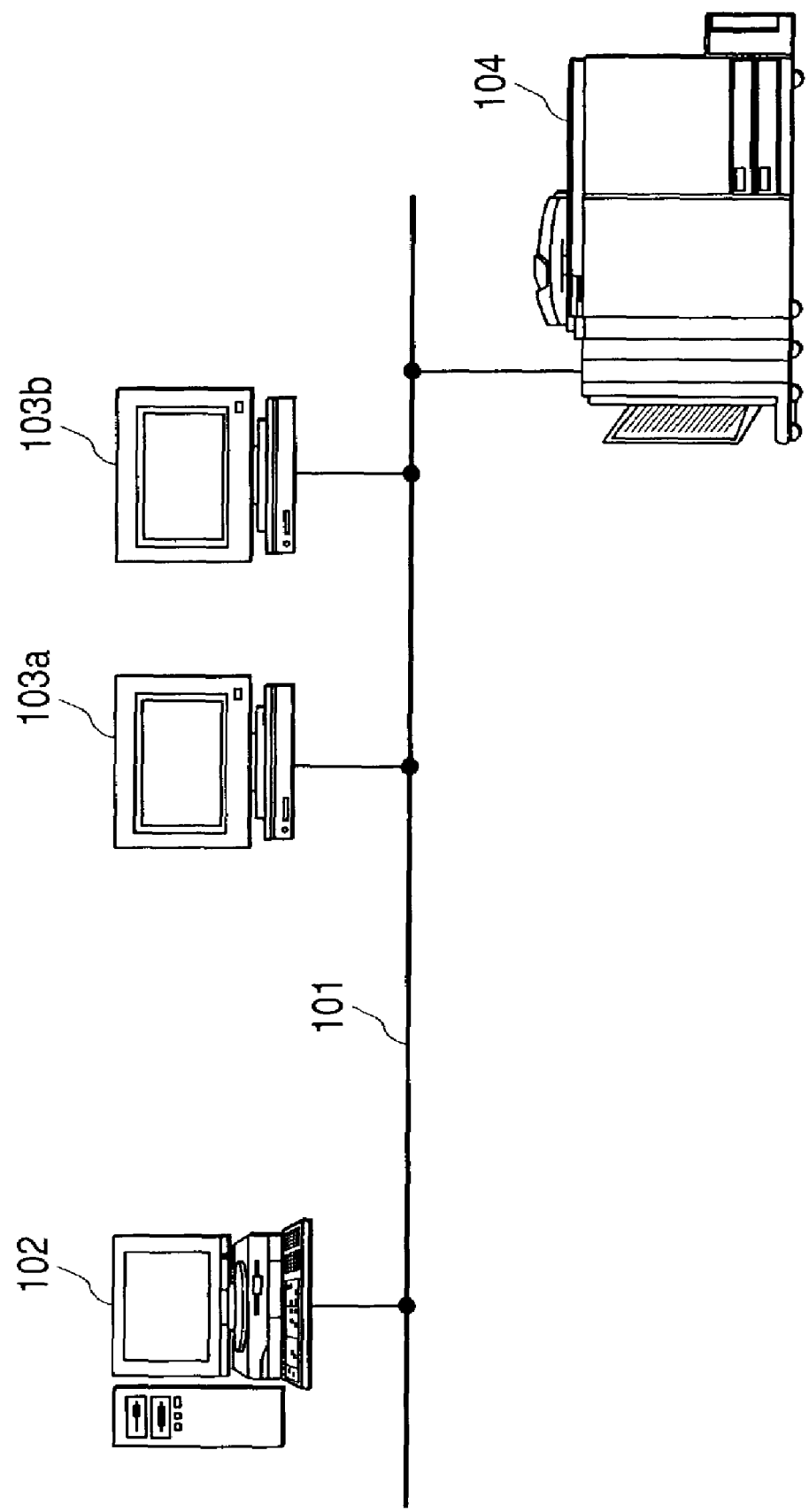
FIG. 1 is a block diagram showing the structure of an image forming system according to the embodiments.

FIG. 1 is a block diagram showing an image forming system according to the first embodiment of the present invention. In FIG. 1, a computer 102 is a server which is connected to a network 101, and computers 103a and 103b are clients which are also connected to the network 101. Although it is not shown in FIG. 1, it should be noted that a lot of other clients are connected to the network 101, and all of these clients are representatively called a client 103 hereinafter.

Moreover, an MFP 104 which is a color-four-drum MFP capable of performing full-color image reading, full-color printing, facsimile transmission, facsimile reception and the like is connected to the network 101. Moreover, although it is not shown in FIG. 1, various other apparatuses such as another MFP, a scanner, a printer, a facsimile machine and the like are connected to the network 101.

Here, on the computer 103, application software for executing so-called DTP (Desktop Publishing) operates, whereby various texts and figures are formed and edited. Then, the computer 103 converts the formed texts and figures into PDL data, and transmits the obtained PDL data to the MFP 104 through the network 101, whereby the transmitted data is printed out.

The MFP 104 includes a communication means capable of exchanging information to the computers 102 and 103 through the network 101, whereby the information and the state of the MFP 104 are sequentially notified to the computers 102 and 103. Moreover, each of the computers 102 and 103 includes utility software which operates in response to the information notified by the MFP 104, and thus the MFP 104 is administrated by the computers 102 and 103.

<Structure of MFP 104>

Figure 2:
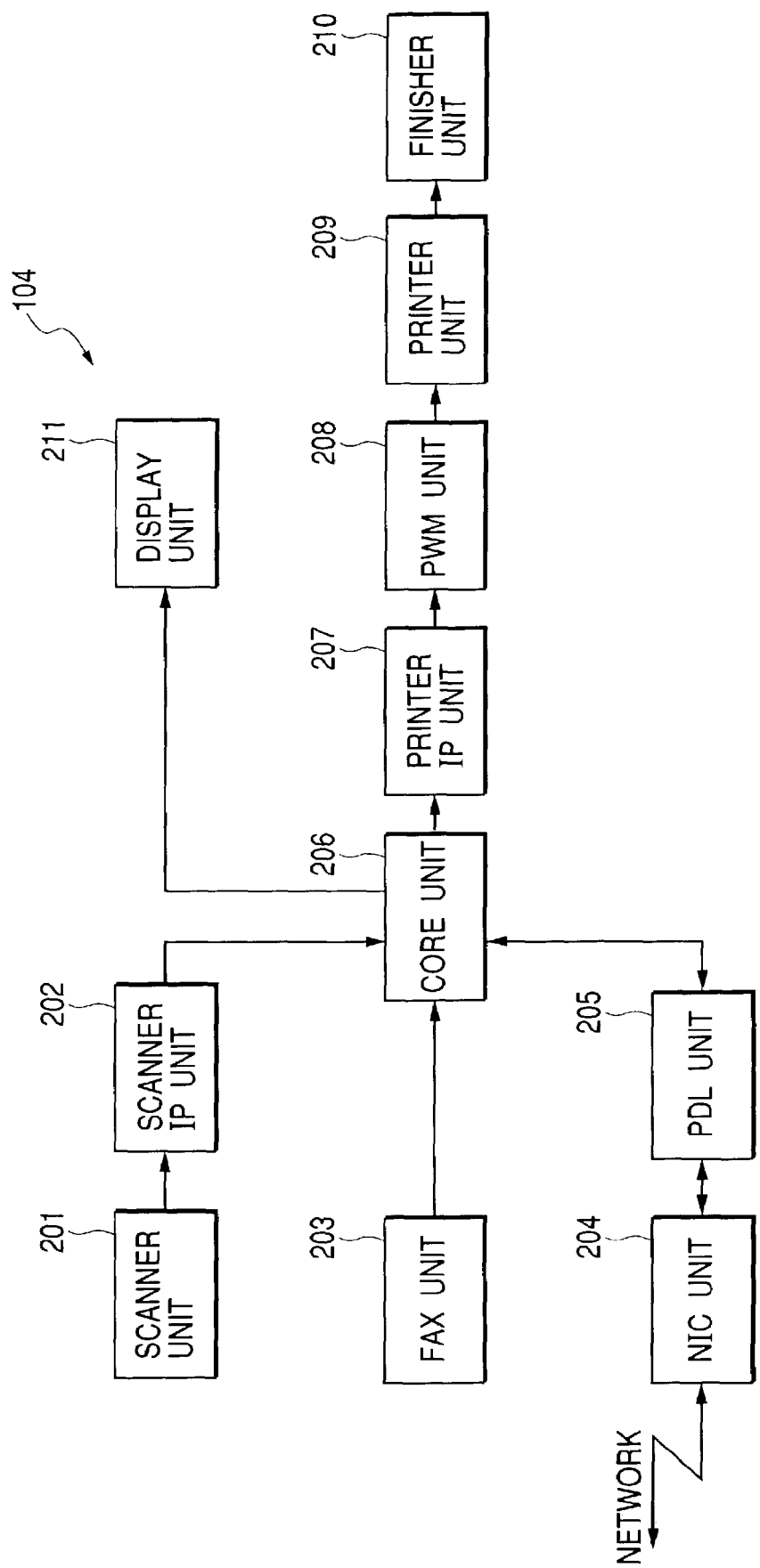
FIG. 2 is a block diagram showing the structure of an MFP 104.

FIG. 2 is a block diagram showing the structure of the MFP 104 which includes a four-drum-type full-color printer. More specifically, the MFP 104 includes a scanner unit 201 which performs image reading and generates image data, a scanner IP unit 202 which performs an image process to the image data obtained by the scanner unit 201, a FAX unit 203 such as a facsimile machine or the like which transmits and receives image data by using a telephone line, an NIC (Network Interface Card) unit 204 which exchanges image data and device information by using the network, and a PDL unit 205 which expands the PDL data transmitted from the computer 103 into an image signal. A core unit 206 temporarily stores the image signal and determines a path in accordance with how to use the MFP 104.

The image data output from the core unit 206 is subjected to an image process by a printer IP unit 207 and then transferred to a printer unit 209 through a PWM unit 208, whereby the image data is actually printed out on a sheet. Then, the sheet discharged from the printer unit 209 is transported to a finisher unit 210 for a sheet sorting process and a sheet finishing process.

On one hand, a display unit 211 is used to a so-called preview process. In the preview process, it is possible to confirm the contents of the image without printing out it, and it is also possible to confirm the state of the image before printing out it.

<Structure of Scanner Unit 201>

Figure 3:
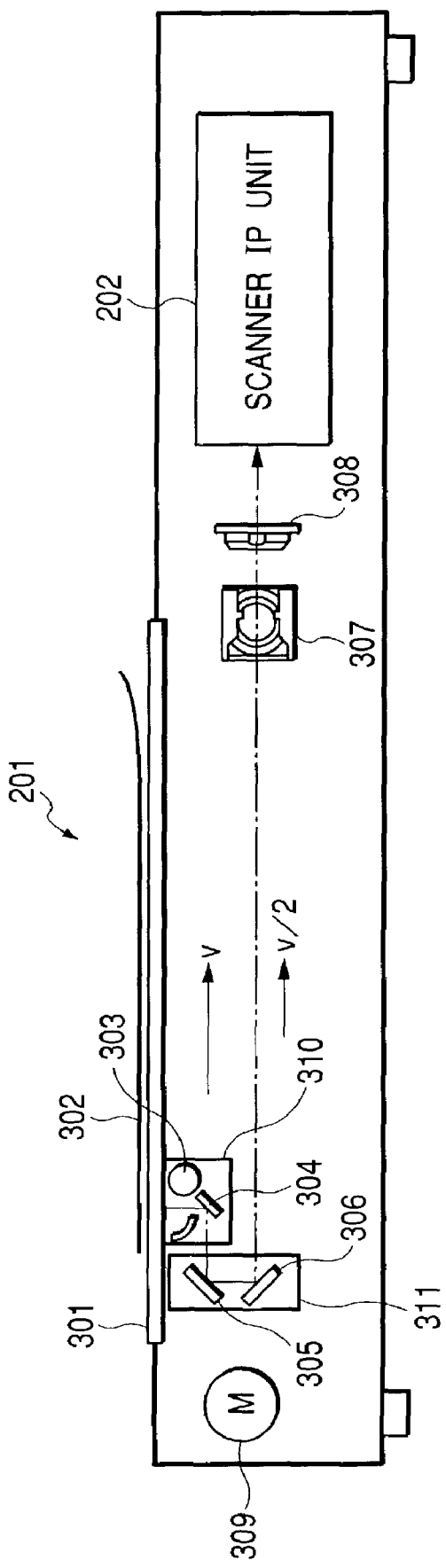
FIG. 3 is a cross-section diagram showing the structure of a scanner unit 201.

FIG. 3 is a cross-section diagram showing the structure of the scanner unit 201. In FIG. 3, numeral 301 denotes an original mounting board glass on which an original 302 to be read is put. The original 302 put on the original mounting board glass 301 is illuminated by an illumination lamp 303, and its reflection light is guided to a CCD sensor 308 through mirrors 304, 305 and 306 and a lens 307, whereby the image based on the guided reflection light is formed on the CCD sensor 308. A first mirror unit 310 including the mirror 304 and the illumination lamp 303 moves at a speed v, and a second mirror unit 311 including the mirrors 305 and

306 moves at a speed v/2, whereby the surface of the original 302 is scanned as a whole. Here, the first mirror unit 310 and the second mirror unit 311 are driven by a motor 309.

<Structure of Scanner IP Unit 202>

Figure 4:
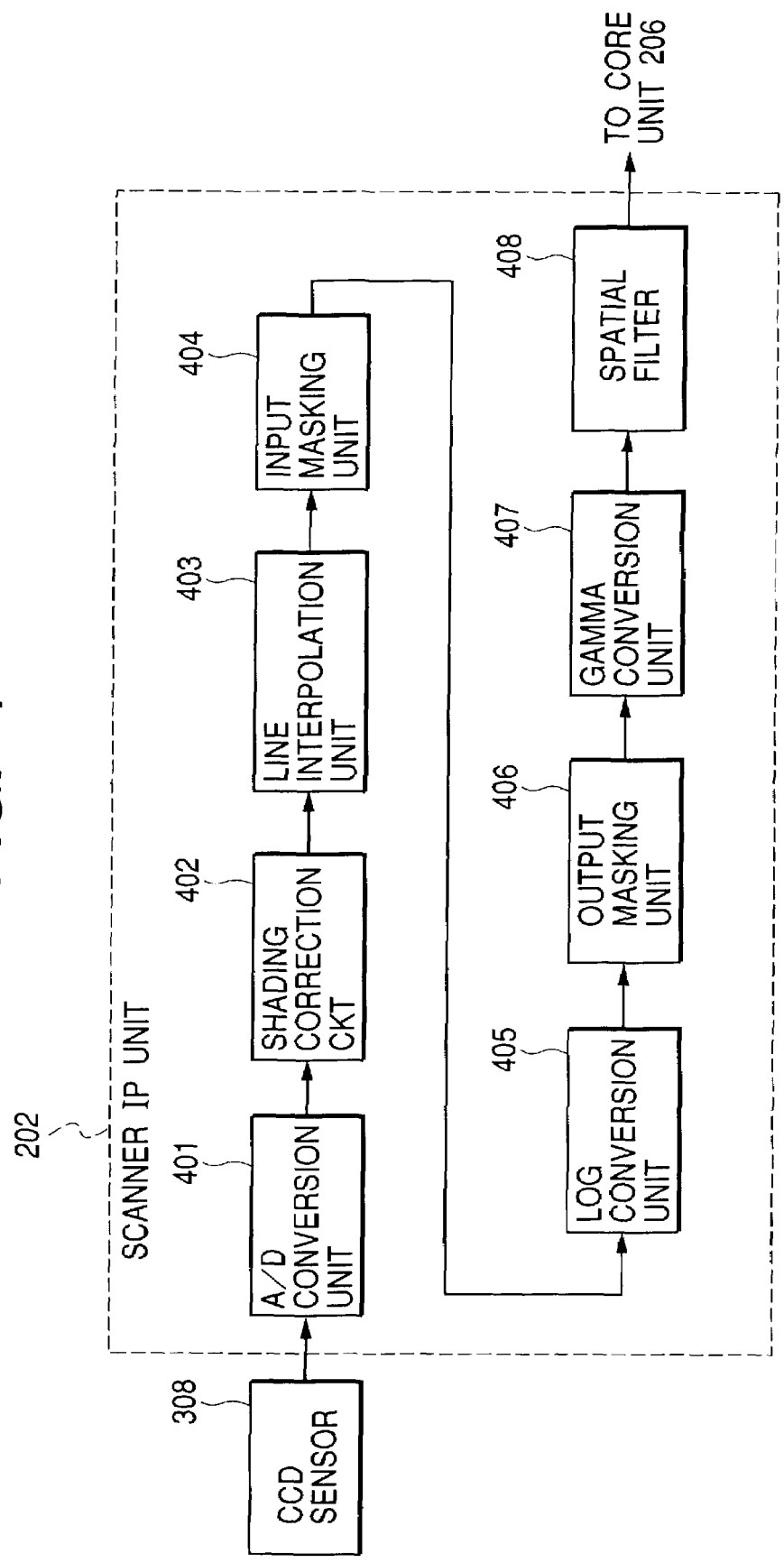
FIG. 4 is a block diagram showing the structure of a scanner IP (Information Processing) unit 202.

FIG. 4 is a block diagram showing the structure of the scanner IP unit 202. An optical signal obtained by the scanner unit 201 is converted into an electrical signal by the CCD sensor 308 and input to the scanner IP unit 202. Here, the CCD sensor 308 is an R, G and B three-line color sensor. In the scanner IP unit 202, each of the input R, G and B image signals is converted into an eight-bit digital image signal by an A/D conversion unit 401. The obtained digital image signals are respectively called RO, GO and BO image signals.

Then, a known shading correction process using a signal read from a reference white plate is performed for each color by a shading correction circuit 402. Moreover, since the color line sensors constituting the CCD sensor 308 are arranged mutually apart from each other by a predetermined distance, spatial aberration (or misregistration) in the sub scan direction is corrected by a line delay adjustment circuit (line interpolation unit) 403.

An input masking unit 404 is to convert a reading color space determined by spectral characteristics of the R, G and B filters of the CCD sensor 308 into an NTSC (National Television System Committee) standard color space. That is, in the input masking unit 404, a 3×3 matrix operation using a constant inherent in the apparatus is performed in consideration of various characteristics such as a sensitivity characteristic of the CCD sensor 308, a spectral characteristic of the illumination lamp and the like, whereby the input RO, GO and BO image signals are respectively converted into the standard R, G and B signals.

A brightness/density conversion unit (LOG conversion unit) 405 includes an LUT (Look-Up Table) RAM. In the LOG conversion unit 405, the R, G and B brightness signals are converted into C, M and Y density signals (called C1, M1 and Y1 signals), and then the C1, M1 and Y1 image signals are processed and transferred to the core unit 206 through an output masking unit 406, a gamma conversion unit 407 and a spatial filter 408.

<Structure of NIC Unit 204>

Figure 5:
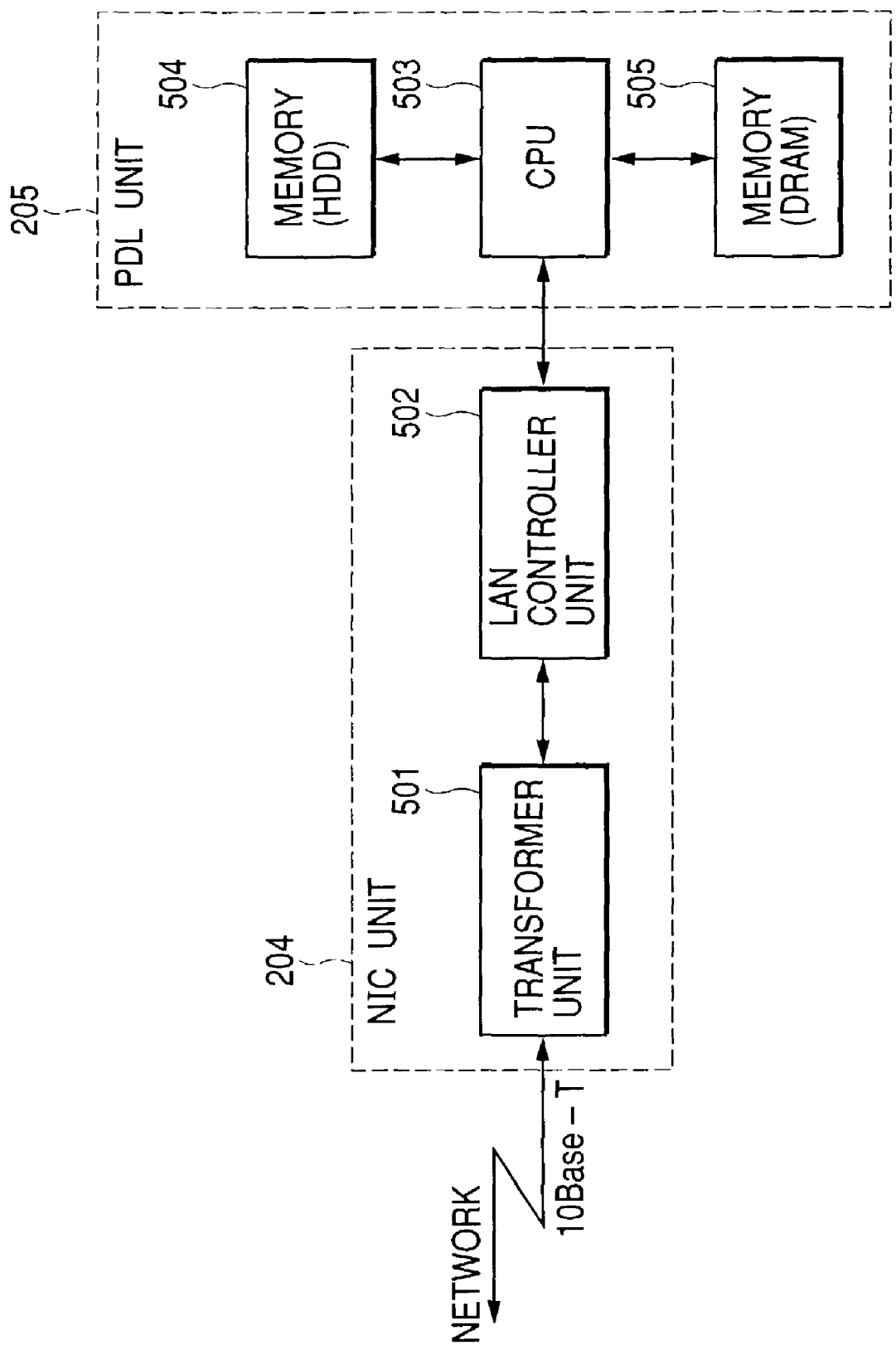
FIG. 5 is a block diagram showing the structures of an NIC (Network Interface Card) unit 204 and a PDL (Page Description Language) unit 205.

FIG. 5 is a block diagram showing the structures of the NIC unit 204 and the PDL unit 205. The NIC unit 204 has an interface function to the network 101 and thus functions to obtain external information and transmit information outward by using, e.g., an Ethernet™ cable such as 10Base-T, 100Base-TX or the like.

In case of obtaining the information externally, the data representing information is first subjected to voltage transformation by a transformer unit 501 and then transferred to a LAN controller unit 502 which includes a first buffer memory (not shown) to store the transferred data. Then, it is judged whether or not the information represented by the transferred data is necessary information. If judged that the information in question is the necessary information, the data is transferred to a second buffer memory (not shown) and then transferred to the PDL unit 205.

On the other hand, in case of transmitting the information outward, necessary information is added to the data transferred from the PDL unit 205 by the LAN controller unit 502, and then the obtained data is output to the network 101 through the transformer unit 501.

<Structure of PDL Unit 205>

The image data generated by the application software operating on the computer 103 represents texts, figures, photographs and the like and is thus composed of the combination of image description elements such as character codes, graphic codes, raster image data and the like. This is the so-called PDL which is represented by, e.g., PostScript™ by Adobe.

The PDL unit 205 converts the PDL data into raster image data. That is, the PDL data transferred from the NIC unit 204 is once stored in a large-capacity memory 504 such as an HDD (Hard Disk Drive), and the stored data is administrated and held for each job.

A CPU 503 performs a rasterizing image process which is called RIP (Raster Image Processing) according to need, and expands the PDL data into the raster image data. The expanded raster image data is stored in a high-speed accessible memory 505 such as a DRAM or the like for each of the C, M, Y and K color components. Here, it should be noted that, in each job, the raster image data is stored for each page. After then, the raster image data is transferred to the core unit 206 by the CPU 503, in accordance with the state of the printer unit 209.

<Structure of Core Unit 206>

Figure 6:
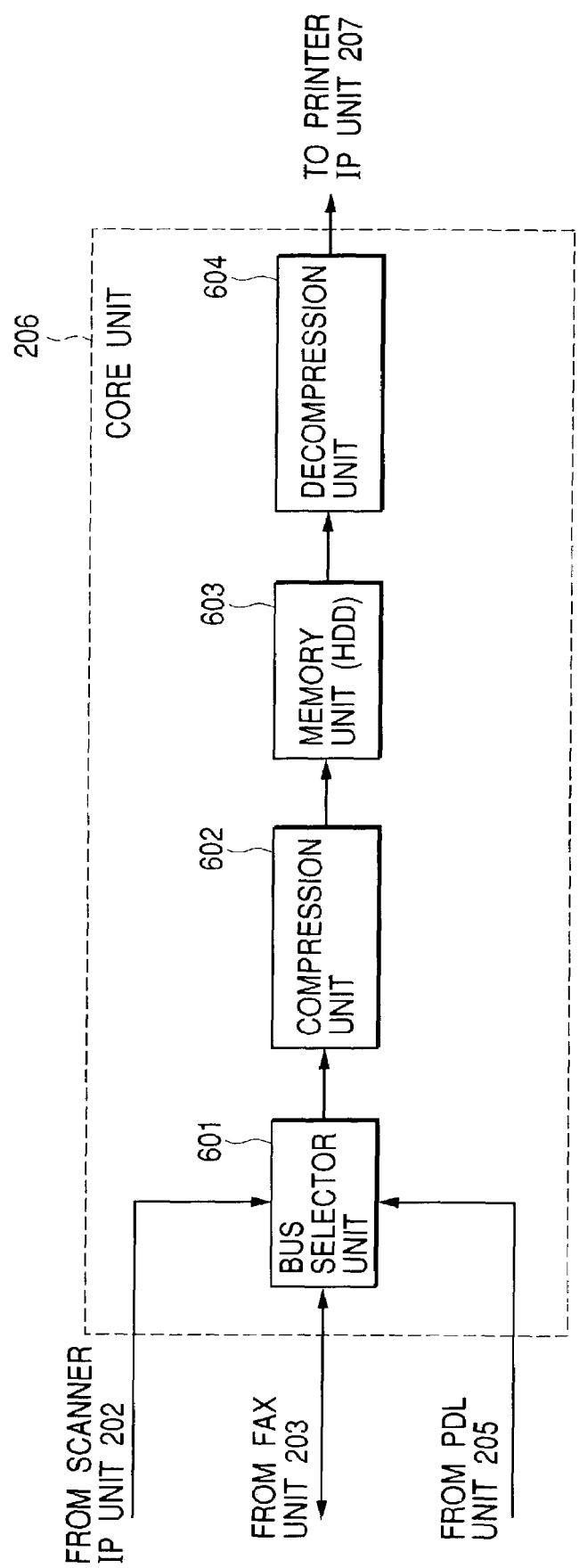
FIG. 6 is a block diagram showing the structure of a core unit 206.

FIG. 6 is a block diagram showing the structure of the core unit 206. In the core unit 206, a bus selector unit 601 saves as, in a manner of speaking, data traffic control in the MFP 104. That is, the bus selector unit 601 switches over the buses in accordance with various functions in the MFP 104 such as a copying function, network scanning, network printing, facsimile transmission, facsimile reception, display and the like.

The following are the bus switching patterns for executing the respective functions.

copying function: scanner unit 201→core unit 206→printer unit 209 network scanning: scanner unit 201→core unit 206→NIC unit 204 network printing: NIC unit 204→core unit 206→printer unit 209 facsimile transmission function: scanner unit 201→core unit 206→FAX unit 203 facsimile reception function: FAX unit 203→core unit 206→printer unit 209 display function: scanner unit 201, FAX unit 203 or NIC unit 204→core unit 206→display unit 211

Next, the image data output from the bus selector unit 601 is transferred to the printer unit 209 (PWM unit 208) or the display unit 211 through a compression unit 602, a memory unit 603 including a large-capacity memory such as an HDD or the like, and a decompression unit 604.

A compression system to be used in the compression unit 602 may be a general system such as JPEG (Joint Photographic Experts Group) system, JBIG (Joint Bi-level Image experts Group) system, ZIP system or the like. The compressed image data is administrated for each job, and stored together with additional data representing a file name, an author, generation date and time, a file size and the like.

Moreover, a job number and a job password are provided and stored together with the image data, whereby it is possible to support a personal box function. This is the function by which the data can be temporarily stored or only a certain user can print out the stored data (i.e., data reading from the HDD). If it is instructed to print out the job stored in the memory unit 603, authentication is performed on the basis of the password, the image data is read from the memory 603 if the password is correct, the read image data is decompressed or expanded by the decompression unit 604 to obtain the raster image data, and then the obtained raster image data is transferred to the printer IP unit 207.

<Structure of Printer IP Unit 207>

Figure 7:
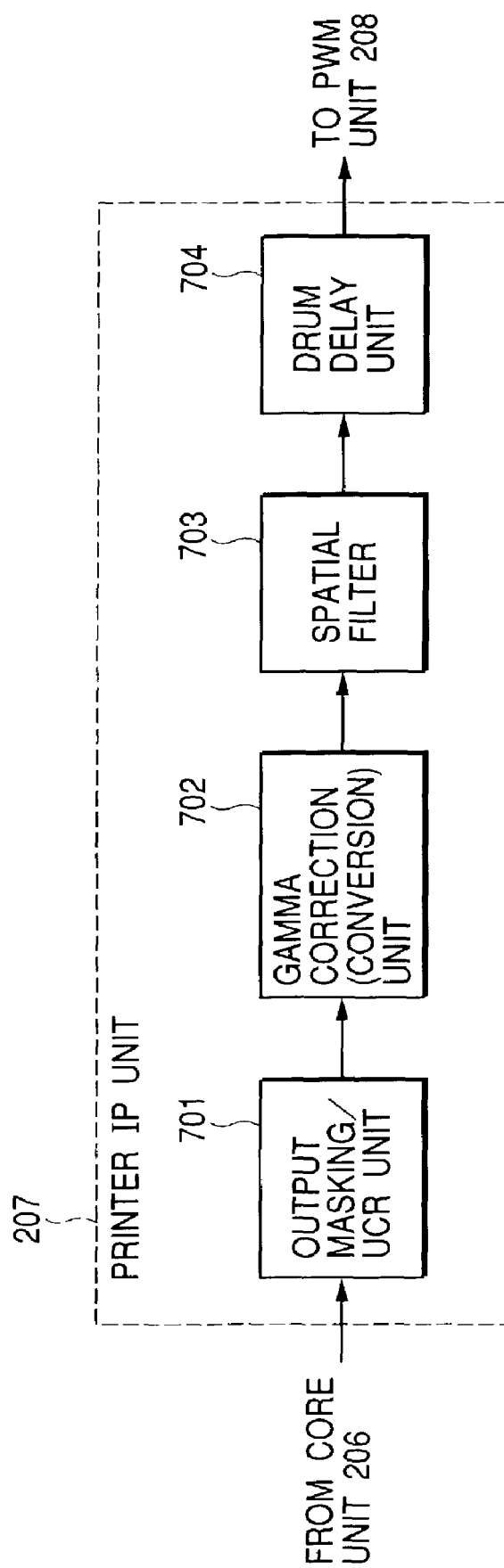
FIG. 7 is a block diagram showing the structure of a printer IP unit 207.

FIG. 7 is a block diagram showing the structure of the printer IP unit 207. In FIG. 7, numeral 701 denotes an output masking/UCR (under color removal) circuit which corrects the C1, M1 and Y1 signals and thus obtains the C, M, Y and K signals respectively representing toner colors of the image forming apparatus. Then, the output masking/UCR circuit 701 outputs the C, M, Y and K signals.

Numeral 702 denotes a gamma correction (conversion) unit which converts the input C, M, Y and K signals into C, M, Y and K data for image output by using an LUT RAM provided in consideration of the various color characteristics of toners. Numeral 703 denotes a spatial filter by which an edge emphasizing process or a smoothing process is performed to the C, M, Y and K data.

Numeral 704 denotes a drum delay unit which includes a memory necessary in case of delaying the image data for each color according to the distance between the photosensitive drums. The image signal which has been delayed for each color by the drum delay unit 704 is then transferred to the PWM unit 208.

<Structure of PWM Unit 208>

Figure 8:
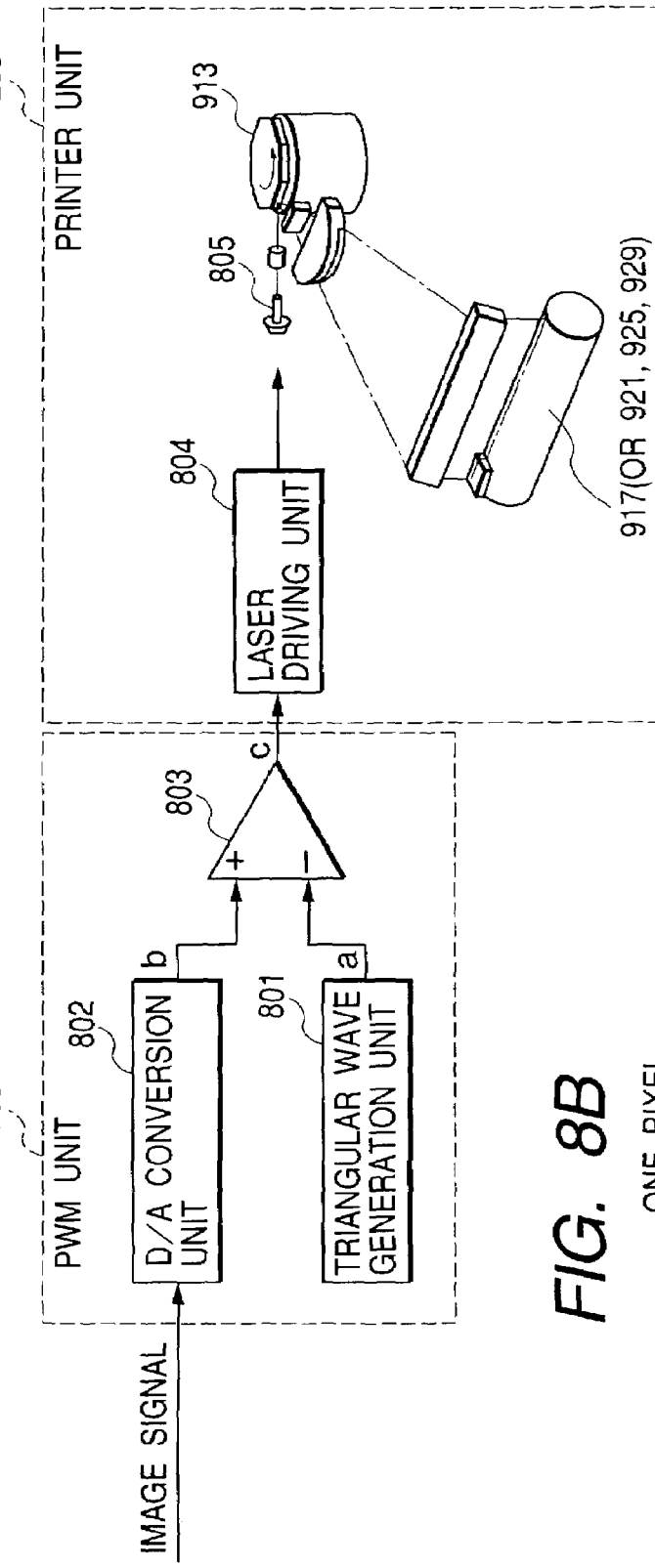
FIGS. 8A and 8B are respectively a block diagram showing the structure of a PWM (Pulse Width Modulation) unit 208 and a timing chart for explaining the operation of the PWM unit 208.

FIGS. 8A and 8B are respectively a block diagram showing the structure of the PWM unit 208 and a timing chart for explaining the operation of the PWM unit 208. The multi-valued image data representing each of the separated Y, M, C and K output from the printer IP unit 207 is subjected to the image formation through the PWM unit 208.

In FIG. 8A, numeral 801 denotes a triangular wave generation unit, and numeral 802 denotes a D/A converter (D/A conversion unit) which converts the input digital image signal into an analog signal. An output signal a generated from the triangular wave generation unit 801 and an output signal b generated from the D/A conversion unit 802 are compared with each other by a comparator 803, and an output signal c representing the compared result is transferred to a laser driving unit 804. Here, for each of C, M, Y and K, a laser beam output from a laser oscillator 805 driven by the laser driving unit 804 is modulated on the basis of the output signal c of the comparator 803.

The laser beams of C, M, Y and K output from the laser oscillator 805 are scanned by a polygonal scanner 913 and thus irradiated to photosensitive drums 917, 921, 925 and 929 respectively.

<Structure of Printer Unit 209 of MFP 104 (Four-Drum Type Printer)>

Figure 9:
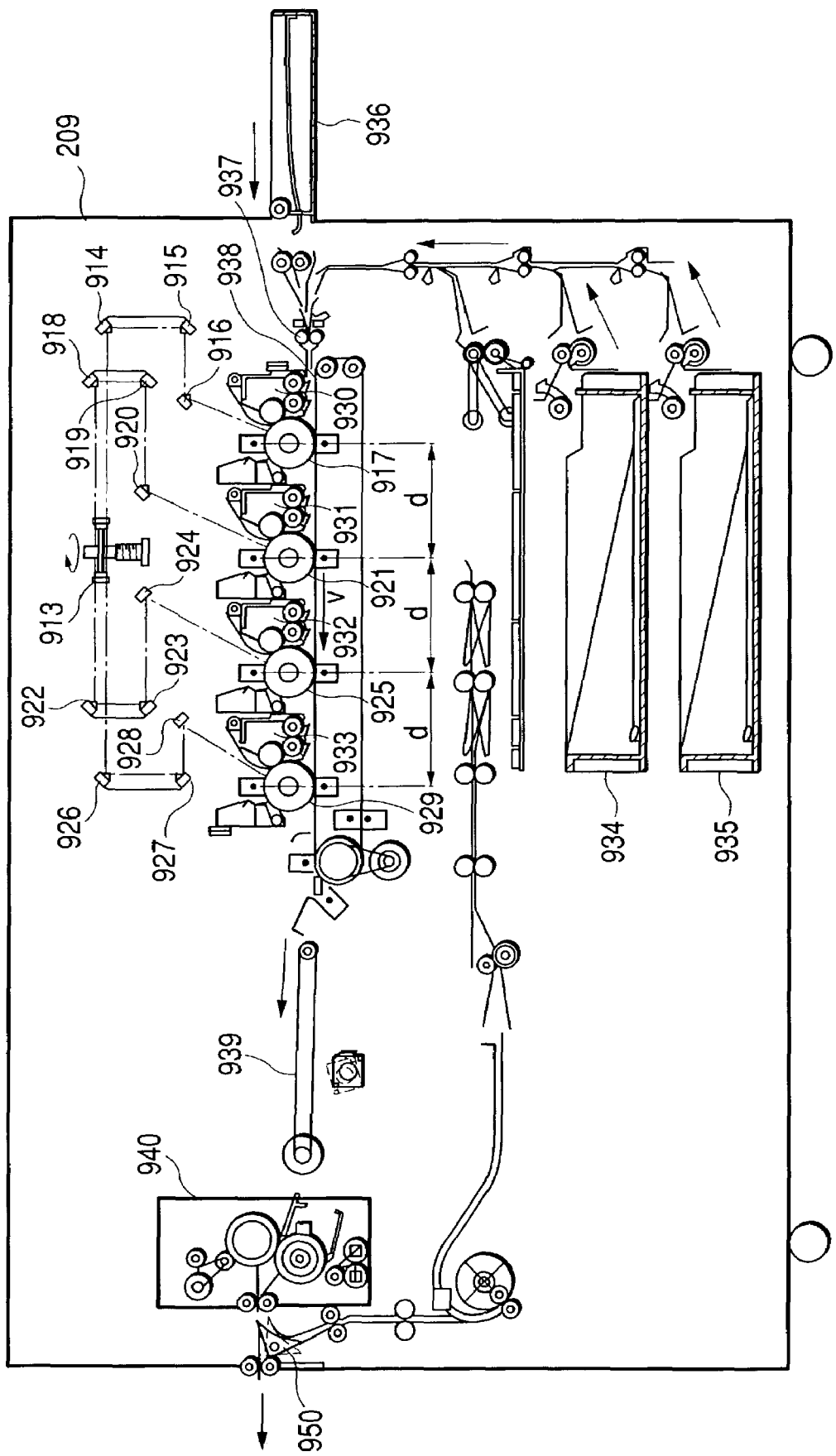
FIG. 9 is a cross-section diagram showing the structure of a four-drum type color printer unit 209.

FIG. 9 is a cross-section diagram showing the structure of a four-drum type color printer unit 209. In FIG. 9, numeral 913 denotes a polygonal mirror (polygonal scanner) which receives the four laser beams respectively generated from the four semiconductor laser oscillators 805 for C, M, Y and K. One of these four laser beams is scanned on the photosensitive drum 917 through mirrors 914, 915 and 916, another laser beam is scanned on the photosensitive drum 921 through mirrors 918, 919 and 920, another laser beam is scanned on the photosensitive drum 925 through mirrors 922, 923 and 924, and the remaining one of these four laser beams is scanned on the photosensitive drum 929 through mirrors 926, 927 and 928.

Numeral 930 denotes a development unit which supplies Y toner, and thus forms a yellow toner image based on an electrostatic latent image formed by the laser beam on the photosensitive drum 917. Numeral 931 denotes a development unit which supplies M toner, and thus forms a magenta toner image based on an electrostatic latent image formed by the laser beam on the photosensitive drum 921. Numeral 932 denotes a development unit which supplies C toner, and thus forms a cyan toner image based on an electrostatic latent image formed by the laser beam on the photosensitive drum 925. Numeral 933 denotes a development unit which supplies K toner, and thus forms a black toner image based on an electrostatic latent image formed by the laser beam on the photosensitive drum 929. When these toner images of four colors Y, M, C and K are transferred onto a sheet, a full-color output image can be obtained.

A sheet supplied from any one of sheet cassettes 934 and 935 and a manual feed tray 936 is adsorbed onto a transfer belt 938 through a registration roller 937, whereby the sheet is transported by the transfer belt 938. On the other hand, the respective toner images have been previously developed on the photosensitive drums 917, 921, 925 and 929 in synchronism with sheet transportation timing, whereby the toner images are transferred to the sheet while the sheet is being transported.

The sheet on which the toner images of the respective colors have been transferred is separated from the transfer belt 938 and then further transported by a transfer belt 939, and the toners on the sheet are fixed by a fixing unit 940. The sheet which passed the fixing unit 940 is once guided downward by a flapper 950, and then the sheet is switched back after the trailing edge of the sheet passed the flapper 950. After then, the switched-back sheet is discharged outward. As a result, the sheet is discharged facedown, so that the pages can be set in due order when the images are printed out from the first page thereof.

It should be noted that the four photosensitive drums 917, 921, 925 and 929 are arranged at an identical interval (distance) d. If the sheet is transported by the transportation belt 939 at a certain speed v, the above operations are synchronously performed as a whole, and also the four semiconductor laser oscillators 805 for C, M, Y and K are synchronously driven.

<Structure of Display Unit 211>

Figure 10:
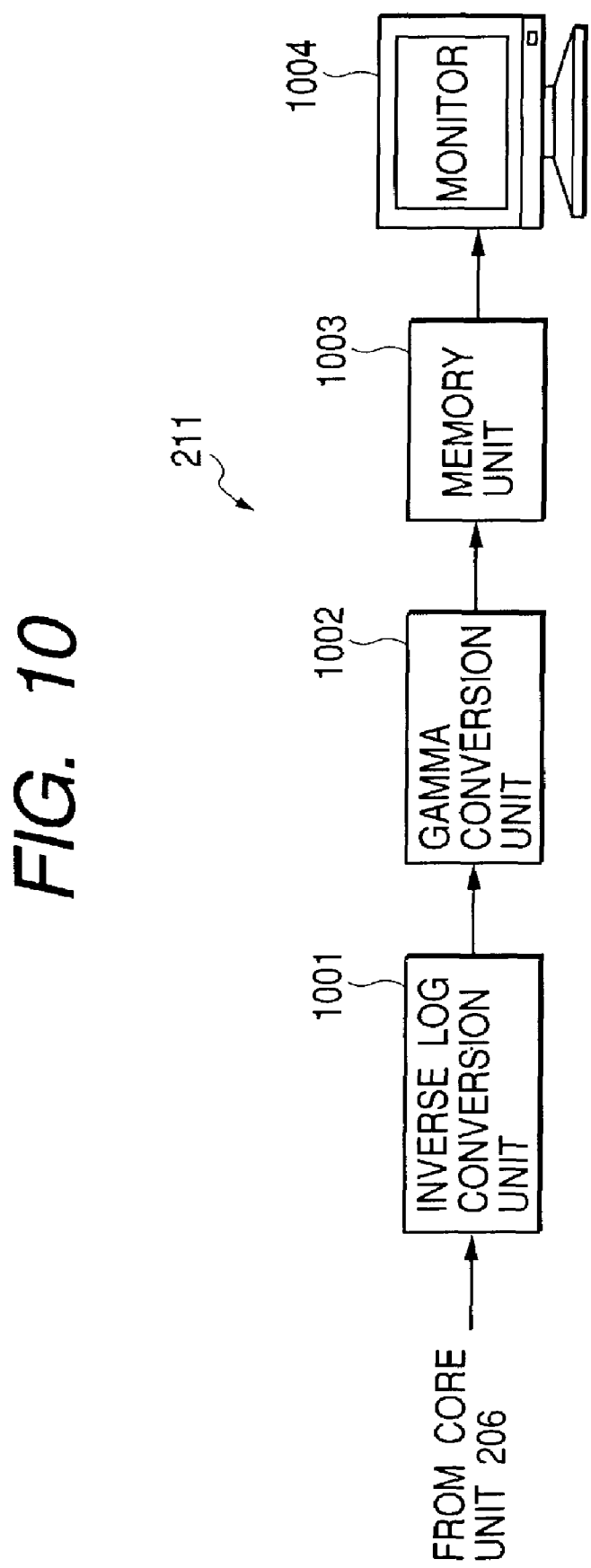
FIG. 10 is a block diagram showing the structure of a display unit 211.

FIG. 10 is a block diagram showing the structure of the display unit 211. In the display unit 211, the image signal output from the core unit 206 is equivalent to the C, M, Y and K data, whereby it is necessary to again convert the input C, M, Y and K data into the R, G and B data by an inverse LOG conversion unit 1001. Then, in a gamma conversion unit 1002, output conversion is performed to the R, G and B data by using an LUT to cope with color characteristics of a display (monitor) 1004 such as a CRT or the like. More specifically, the converted image data is once stored in a memory unit 1003 and then displayed on the display 1004.

Here, it should be noted that the object of use of the display 211 is to execute a preview function, execute a proof function, or confirm beforehand whether or not it is necessary to perform actual printing. That is, a user can confirm by using the preview function the image to be output prior to actual printing, and also can judge by using the proof function whether or not the image to be output is equivalent to the intended image. Thus, it is possible to prevent wasteful use of recording sheets.

<Structure of Finisher Unit 210>

Figure 11:
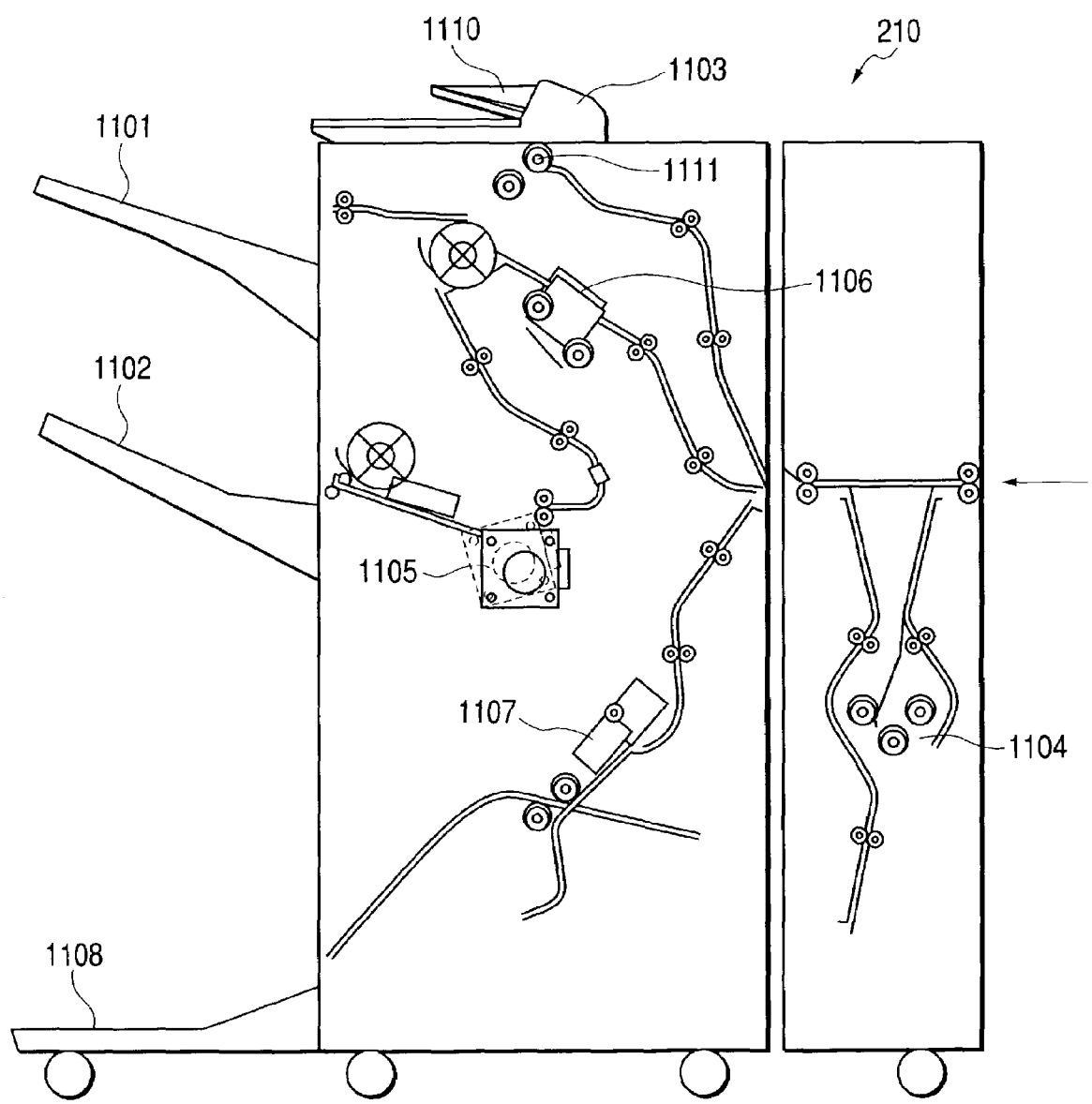
FIG. 11 is a cross-section diagram showing the structure of a finisher unit 210.

FIG. 11 is a cross-section diagram showing the structure of the finisher unit 210. The sheets discharged from the fixing unit 940 of the printer unit 209 are entered into the finisher unit 210. Incidentally, since a sample tray 1101 and a stack tray 1102 are provided on the finisher unit 210, the tray to be used is selected and changed according to a kind of job and the number of sheets to be discharged, whereby the sheets are actually discharged to the selected tray.

In a case where a sorting operation is performed, it is possible to use one of two sorting systems, that is, one is a bin sorting system to distribute the output sheets to plural bins by using a sorter having the plural bins, and the other is a shift sorting system to distribute the output sheets for each job by shifting the bin (or the tray) toward near and far sides.

If the above core unit 206 has the large-capacity memory, the function of electronic sorting can be supported by using a so-called collating function to make the discharged page order different from the buffered page order with use of the large-capacity memory. On one hand, a group function is a function to perform the sorting for each page.

Moreover, in a case where the sheets are discharged to the stack tray 1102, it is possible to stock for each job the sheets before they are discharged and then to bind the stocked sheets by a stapler 1105 immediately before they are discharged.

Besides, a Z folder 1104 and a puncher 1106 are provided in front of the sample tray 1101 and the stack tray 1102. Thus, the Z folder 1104 folds the sheet like a character "Z", and the puncher 1106 punches two (or three) holes on the sheets for filing them. It should be noted that the sheet folding process and/or the punching process are performed in accordance with the kind of job.

Besides, a saddle stitcher 1107 which performs a saddle stitching process is provided in front of a booklet tray 1108. That is, the saddle stitcher 1107 first binds the sheets at the central two points thereof, center-folds the sheets by applying the center portion of the sheets to a roller, and thus forms a booklet such as a weekly magazine, a pamphlet and the like. Then, the sheets (booklet) subjected to the saddle stitching process by the saddle stitcher 1107 are discharged to the booklet tray 1108.

An inserter 1103 is provided to feed the sheet set on a tray 1110 directly to any one of the sample tray 1101, the stack tray 1102 and the booklet tray 1108 without printer intervention. Thus, the sheet set on the inserter 1103 can be inserted between the successive sheets transported into the finisher 210.

It is assumed that the sheets are set faceup on the tray 1110 by a user. Then, the set sheets are sequentially fed from the uppermost one by a pickup roller 1111, and the sheets fed from the inserter 1103 are directly discharged facedown to the sample tray 1101 or the stack tray 1102, whereby these sheets are discharged facedown. When the sheets are transported to the saddle stitcher 1107, the sheets are once transported to the side of the puncher 1106 and then switched back toward the saddle stitcher 1107, whereby the faces of the sheets respectively transported from the inserter 1103 and the printer are consolidated.

<Structure of Drum Delay Unit 704>

Figure 12:
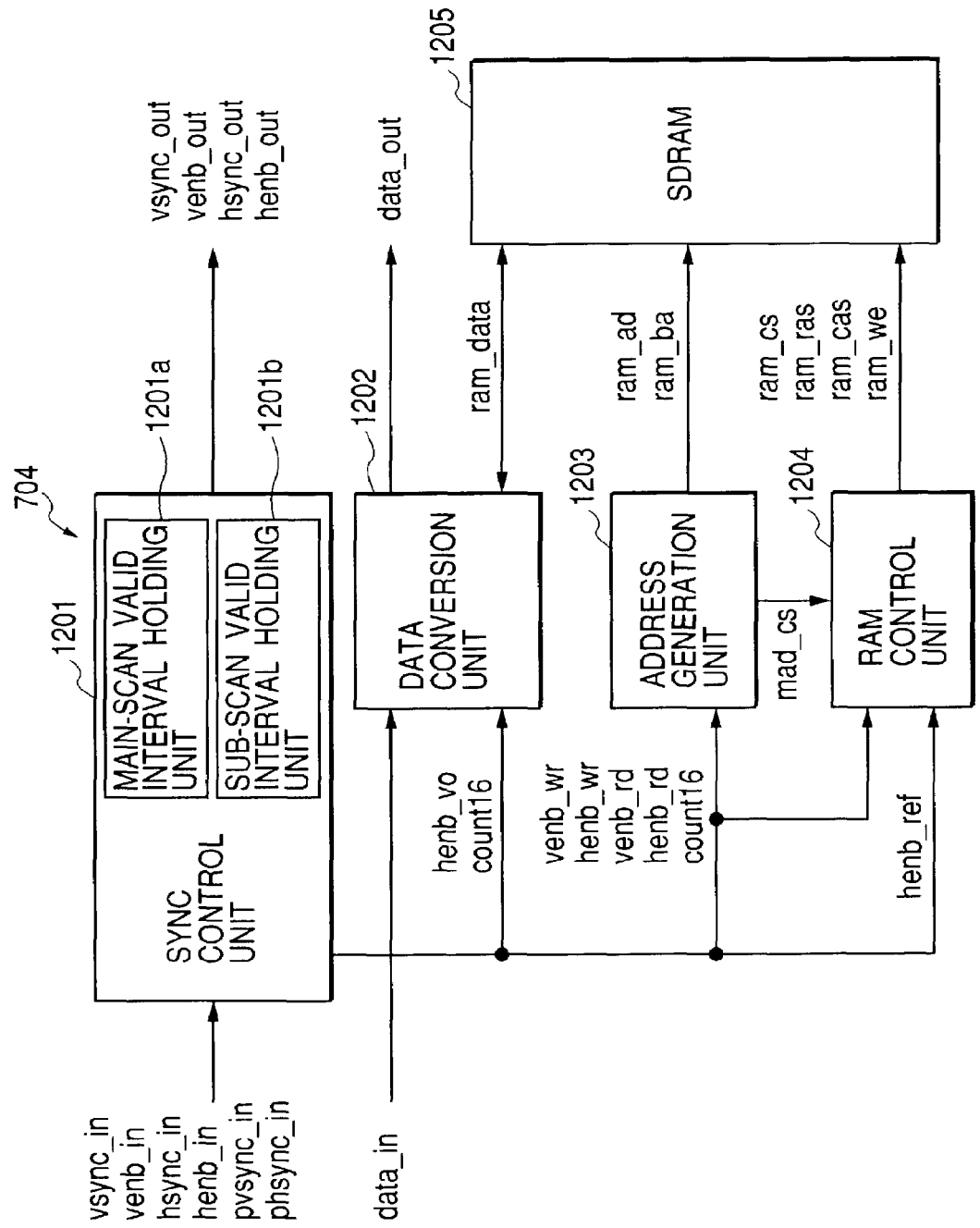
FIG. 12 is a block diagram showing the internal structure of a drum delay unit 704.

FIG. 12 is a block diagram showing the internal structure of the drum delay unit 704. In FIG. 12, numeral 1201 denotes a sync control unit which includes a main-scan valid interval holding unit 1201a and a sub-scan valid interval holding unit 1201b. The main-scan valid interval holding unit 1201a can hold a main-scan valid interval signal henb_in of the length corresponding to the three pages, and similarly, the sub-scan valid interval holding unit 1201b can hold a sub-scan valid interval signal venb_in of the length corresponding to the three pages. Moreover, numeral 1202 denotes a data conversion unit, numeral 1203 denotes an address generation unit, numeral 1204 denotes a RAM control unit, and numeral 1205 denotes an SDRAM (synchronous dynamic RAM) acting as a delay memory.

Here, it should be noted that following image sync signals are input to the sync control unit 1201.
vsync_in: a sync start signal in the sub scan direction
venb_in: the valid interval signal in the sub scan direction
hsync_in: a sync start signal in the main scan direction
henb_in: the valid interval signal in the main scan direction
pvsync_in: a sub-scan activation signal of the printer
phsync_in: a main-scan activation signal of the printer Each of these signals becomes active at its low level. Here, the valid interval signal venb_in in the sub scan direction and the valid interval signal henb_in in the main scan direction change for each page in accordance with an input image size. Moreover, the sub-scan activation signal pvsync_in of the printer and the main-scan activation signal phsync_in of the printer are the activation signals for requesting an image signal input from the printer, and the input timing of each of these signals is different for each color. Incidentally, following controls signals are output from the sync control unit 1201.
count16: a 16 counter signal composed of four-bit counters and counting 16 cycles
venb_wr: a sub-scan valid interval signal for data writing
henb_wr: a main-scan valid interval signal for data writing
venb_rd: a sub-scan valid interval signal for data reading
henb_rd: a main-scan valid interval signal for data reading
henb_vo: a main-scan valid interval signal for data output
henb_ref: a main-scan valid interval signal for refresh control of the SDRAM Each of these signals except for the counter signal count 16 becomes active at its high level. Moreover, four-bit image data data_in is input from the spatial filter 703 to the data conversion unit 1202, the input image data is temporarily stored as 16-bit data for every four pixels, the temporarily stored 16-bit image data is then transferred to the SDRAM 1205 at predetermined timing in response to a sync signal transferred from the sync control unit 1201, and the transferred image data is written in the SDRAM 1205. On the other hand, 16-bit image data ram_data read from the SDRAM 1205 is converted into four-bit image data of four pixels, and the obtained data is output as data data_out. Moreover, signals vsync_out, venb_out, hsync_out and henb_out are output from the sync control unit 1201.

The address generation unit 1203 generates a writing address and a reading address of the SDRAM 1205 in response to the control signal transferred from the sync control unit 1201. When the sub-scan valid interval signal venb_wr for the data writing and the main-scan valid interval signal henb_wr for the data writing both transferred from the sync control unit 1201 are active, the writing address is updated for every 16 cycles. Similarly, when the sub-scan valid interval signal venb_rd for the data reading and the main-scan valid interval signal henb_rd for the data reading are active, the reading address is updated for every 16 cycles.

The respective addresses are converted into the address format suitable for the SDRAM 1205, and then output as an SDRAM address ram_ad and an SDRAM bank address ram_ba. Moreover, the address generation unit 1203 generates a signal mad_cs.

The RAM control unit 1204 generates a chip select signal ram_cs, an RAS (Row Address Strobe) signal ram_ras, a CAS (Conditional Access System) signal ram_cas, and a writing signal ram_we which are necessary for command control of data reading and writing of the SDRAM 1205. Moreover, the RAM control unit 1204 generates a command control signal which is necessary for a refresh operation of the SDRAM 1205.

<Control Timing of Drum Delay Unit 704>

Figure 13:
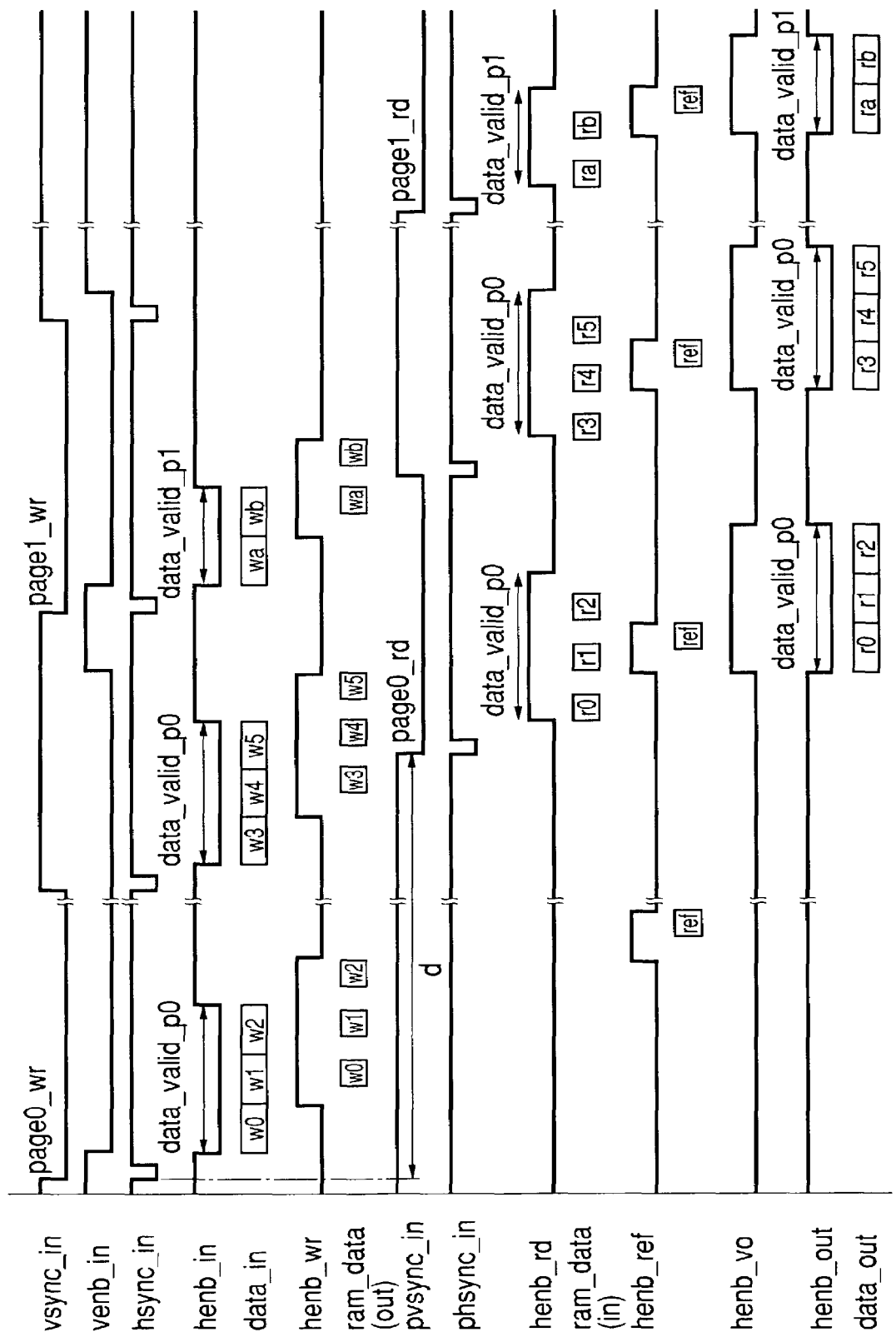
FIG. 13 is a timing chart showing changes of control signals of the drum delay unit 704 in its main scan direction.

FIG. 13 is a timing chart showing changes of the control signals of the drum delay unit 704 in its main scan direction. As described above, the drum delay unit 704 includes the main-scan valid interval holding unit 1201a for holding and storing the length of the main-scan valid interval signal henb_in for each page, whereby the drum delay unit 704 can resultingly store the image data of three pages.

First, the sub-scan valid interval signal venb_in of the first page is input (page0_wr), and then the image signal data_in is input simultaneously with the main-scan valid interval signal henb_in. The data are input for a main-scan valid interval (data$_{13}$ valid_p0) of the first page. In this interval, the data of 16 pixel clocks are temporarily stored as one block (data w0), and then the image data are collected into the block for every 16 clocks (data w1, data w2). Here, it should be noted that, to simplify the explanation, the number of blocks for one line in the main scan direction is set to three, however, more blocks actually exist.

The temporarily stored image data w0, w1 and w2 are output as the data ram_data to the SDRAM 1205 in the interval of the main-scan valid interval signal henb_wr for the data writing, and the image data of each block is stored in the SDRAM 1205. Here, as described above, the length of the main-scan valid interval (data_valid_p0) is stored in the main-scan valid interval holding unit 1201a. Then, data w3, w4 and w5 of the next line are similarly input and written in the SDRAM 1205.

Next, if the sub-scan activation signal pvsync_in and the main-scan activation signal phsync_in of the first page are input from the printer (page0_rd), the sync control unit 1201 generates the main-scan valid interval signal henb_rd for the data reading. The main-scan valid interval signal henb_rd for the data reading is the signal having the same interval length as the main-scan valid interval (data_valid_p0) stored in the main-scan valid interval holding unit 1201a.

In the interval where any writing operation is not performed in the main-scan valid interval signal henb_rd for the data reading, the data reading operation from the SDRAM 1205 is performed, and 16-bit image data r0 corresponding to the image data w0 is read. Then, the read image data r0 is converted into the four-bit image data by the data conversion unit 1202, and the image data thus obtained is output as the data data_out. Then, data r1 and r2 are similarly output for every 16 clocks.

Next, a case where the sub-scan valid interval signal venb_in of the second page is input will be described. Here, a case where the length (data$_{13}$ valid_p1) of the main-scan valid interval signal of the second page is different from the length (data_valid_p0) of the main-scan valid interval signal of the first page will be described. The image data are input for the main-scan valid interval (data_valid_p1) of the second page, the data of 16 clocks are temporarily stored as one block (data wa), and then the image data are collected into the block for every 16 clocks (data wa, data wb). The temporarily stored image data are output to the SDRAM 1205 as the data ram_data in the interval of the main-scan valid interval signal henb_wr for the data writing, whereby the image data of the plural blocks are stored in the SDRAM 1205. Here, as described above, the length (data_valid-p1) of the main-scan valid interval signal is stored in the main-scan valid interval holding unit 1201a.

If the main-scan activation signal phsync_in is input from the printer, 16-bit image data r3 corresponding to the image data w3 of the first page is read from the SDRAM 1205, the read image data is converted into four-bit image data, and then the obtained image data is output as the data data_out. Then, image data r4 and r5 are similarly read out. Here, it should be noted that the main-scan valid interval signal henb_rd for the data reading is output by the length (data_valid_p0) of the stored main-scan valid interval signal of the first page.

Moreover, if the sub-scan activation signal pvsync_in and the main-scan activation signal phsync_in of the second page are input from the printer (page1_rd), 16-bit image data ra corresponding to the image data wa of the second page is read from the SDRAM 1205, the read image data is converted into four-bit image data, and then the obtained image data is output as the data data_out. Then, the image data wb is similarly read out. Here, it should be noted that the main-scan valid interval signal henb_rd for the data reading is output by the length (data_valid_p1) of the stored main-scan valid interval signal of the second page.

Thus, according to the present embodiment, the lengths (data_valid_p0, data_valid_p1, data_valid_p2) of the main-scan valid interval signals of three pages in the data writing are stored beforehand, and the main-scan valid interval signal henb_rd for the data reading corresponding to each page is generated in the data reading. Therefore, even if the data writing of a certain page into the SDRAM 1205 and the data reading of another page from the SDRAM 1205 occur in the same interval, the recording operation can be continued without changing memory access setting on the way and without prolonging the sheet interval.

<Clock Control of Drum Delay Unit 704>

Figure 14:
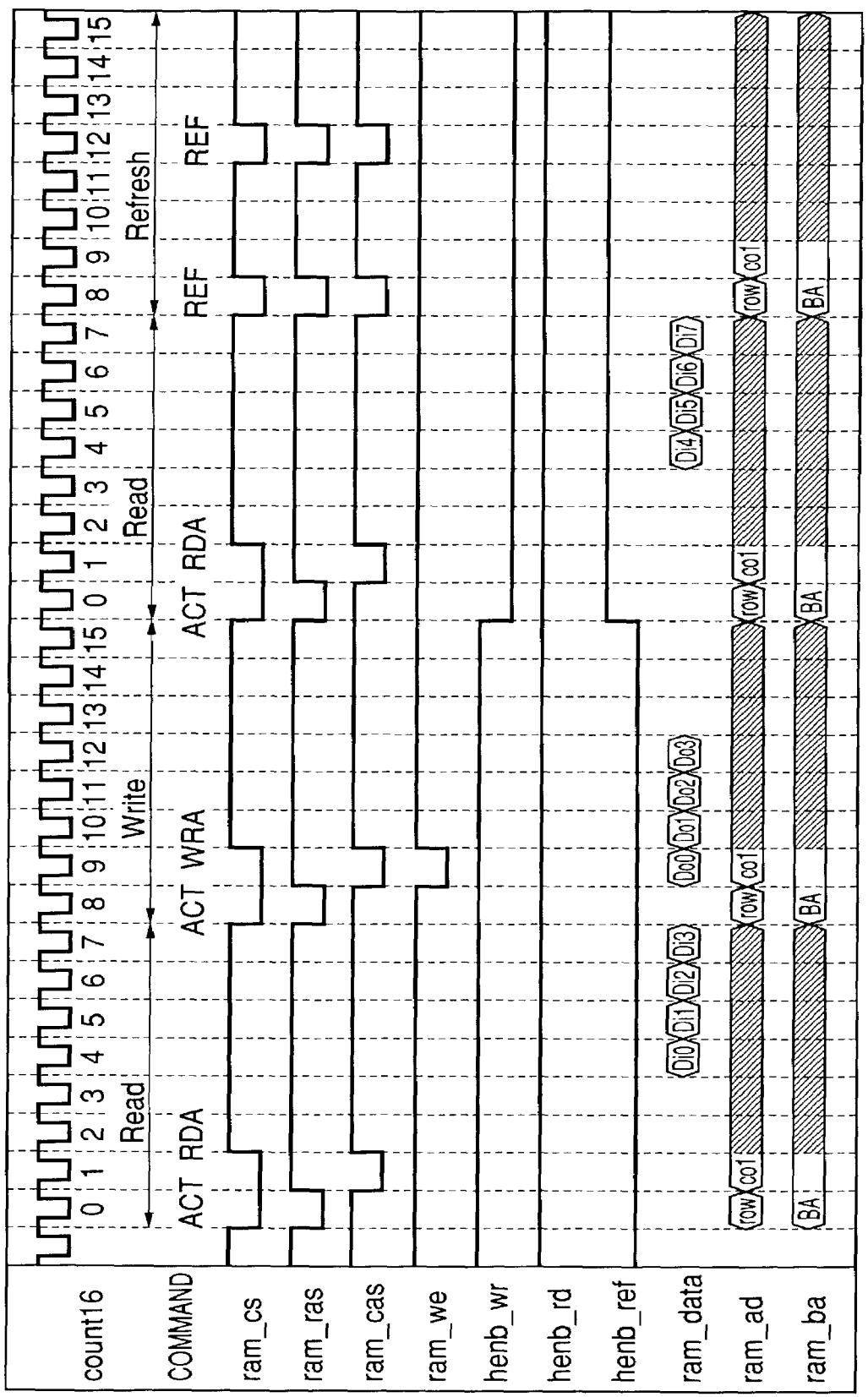
FIG. 14 is a timing chart showing changes of the control signals in unit of clock in the drum delay unit 704.

FIG. 14 is a timing chart showing changes of the control signals in unit of pixel clock in the drum delay unit 704. Incidentally, FIG. 14 shows control timing in unit of clock with respect to the timing chart shown in FIG. 13. In the SDRAM 1205, it is assumed that necessary initial setting and mode setting previously defined are performed by a not-shown circuit, here, CAS latency has been set to "3" and a burst mode has been set to "4".

First, the counter signal count 16 output from the sync control unit 1201 repeatedly counts (represents) the values from "0" to "15". When the main-scan valid interval signal henb_rd for the data reading is active, that is, while the counter signal count 16 represents the values from "0" to "7", the reading operation is performed. On the other hand, when the main-scan valid interval signal henb_wr for the data writing is active, that is, while the counter signal count 16 represents the values from "8" to "15", the writing operation is performed. Moreover, when the main-scan valid interval signal henb_ref for refresh control of the SDRAM (also called refresh valid interval signal henb_ref) is active, that is, while the counter signal count 16 represents the values from "8" to "15", the refresh operation of the SDRAM 1205 is performed. However, it is set that, if the main-scan valid interval signal henb_wr for the data writing is active, the refresh valid interval signal henb_ref does not become active.

When the counter signal count 16 represents the value "0", in order to transfer an active command ACT defined in the specification of the SDRAM, the control signals ram_cs, ram_ras, ram_cas and ram_we are respectively output from the RAM control unit 1204, and also a signal corresponding to the row address included in the RAM address signal ram_ad for the data reading and the bank address signal ram_ba are transferred from the address generation unit 1203.

Next, when the counter signal count 16 represents the value "1", in order to transfer a read command RDA defined in the specification of the SDRAM, the control signals ram_cs, ram_ras, ram_cas and ram_we are output from the RAM control unit 1204, and also a signal corresponding to the column address included in the RAM-address signal ram_ad for the data reading and the bank address signal ram_ba are transferred from the address generation unit 1203. Moreover, when the counter signal count 16 represents the value "4", the 16-bit RAM image data ram_data is output from the SDRAM 1205 as read data Di0. After then, the 16-bit image data are continuously output as read data Di1, read data Di2 and read data Di3.

When the counter signal count 16 represents the value "8", in order to transfer the active command ACT defined in the specification of the SDRAM, the control signals ram_cs, ram_ras, ram_cas and ram_we are respectively output from the RAM control unit 1204, and also a signal corresponding to the row address included in the RAM address signal ram_ad for the data writing and the bank address signal ram_ba are transferred from the address generation unit 1203.

When the counter signal count 16 represents the value "9", in order to transfer a write command WRA defined in the specification of the SDRAM, the control signals ram_cs, ram_ras, ram_cas and ram_we are respectively output from the RAM control unit 1204, and also the signal corresponding to the column address included in the RAM address signal ram_ad for the data writing and the bank address signal ram_ba are transferred from the address generation unit 1203. At the same time, 16-bit write data Do0 is output to the SDRAM 1205. After then, the 16-bit image data are continuously output to the SDRAM 1205 as write data Do1, write data Do2 and write data Do3. If the value of the counter signal count 16 is returned to "0", the same read operation is performed while the counter signal count 16 represents the values from "0" to "17".

When the counter signal count 16 represents the value "8", the refresh valid interval signal henb_ref is active. Thus, in order to transfer a refresh command REF defined in the specification of the SDRAM, the control signals ram_cs, ram_ras, ram_cas and ram_we are respectively output from the RAM control unit 1204. After then, the refresh command REF is similarly transferred when the counter signal count 16 represents the value "12".

<Sub Scan Control of Drum Delay Unit 704>

Figure 15:
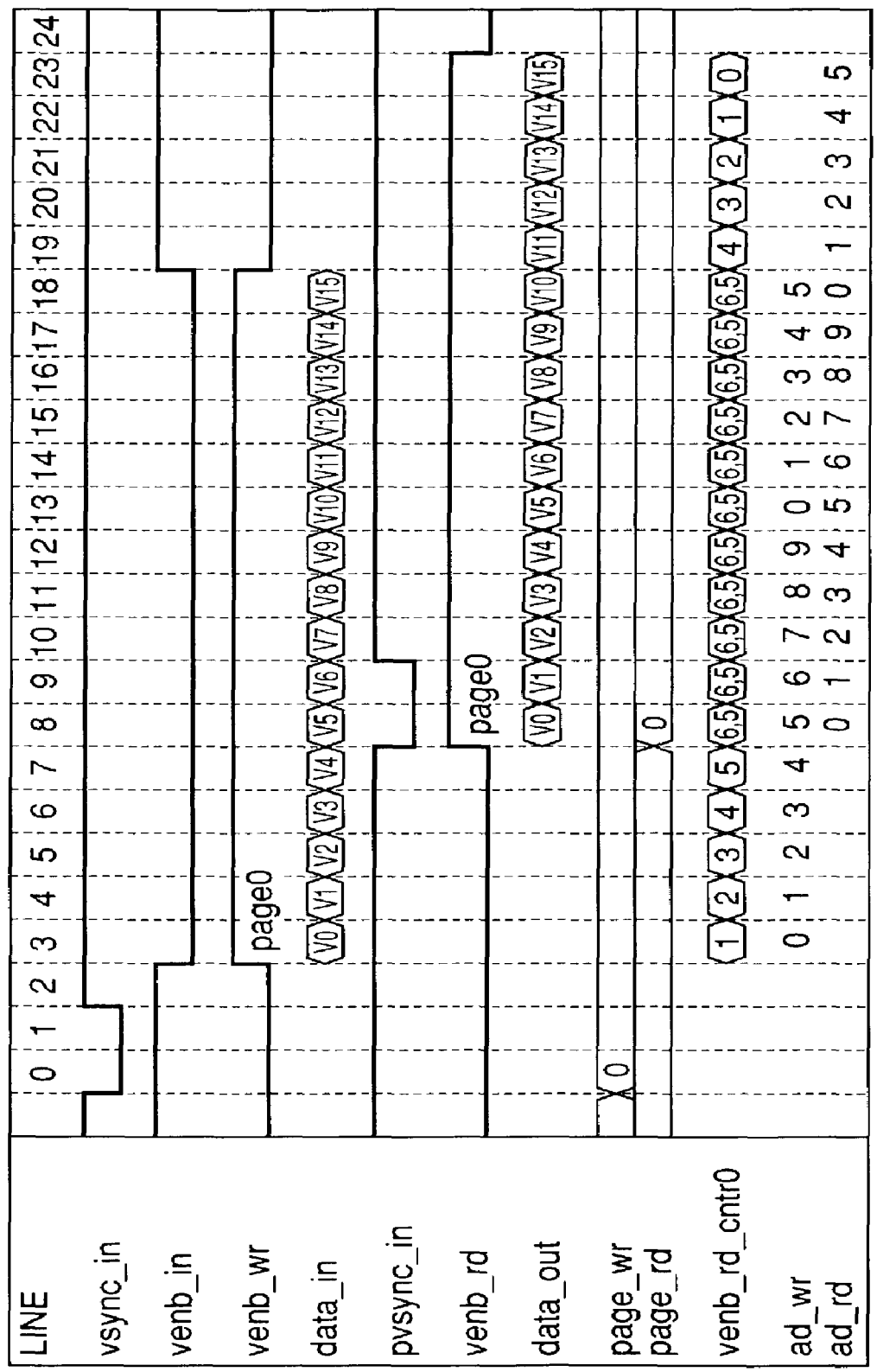
FIG. 15 is a timing chart showing changes of the control signals of the drum delay unit 704 in its sub scan direction.
Figure 16:
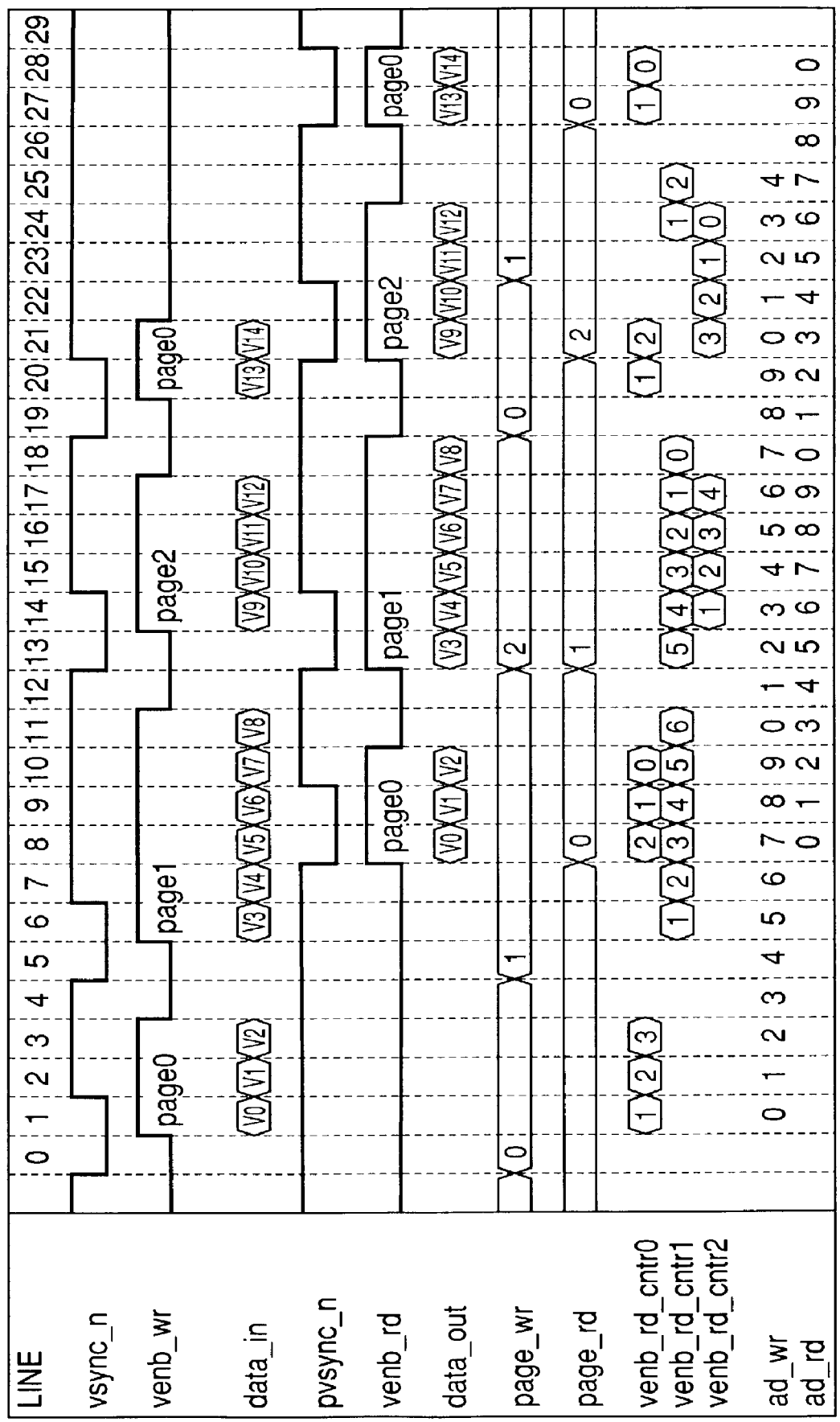
FIG. 16 is a timing chart showing changes of the control signals of the drum delay unit 704 in its sub scan direction.
Figure 17A:
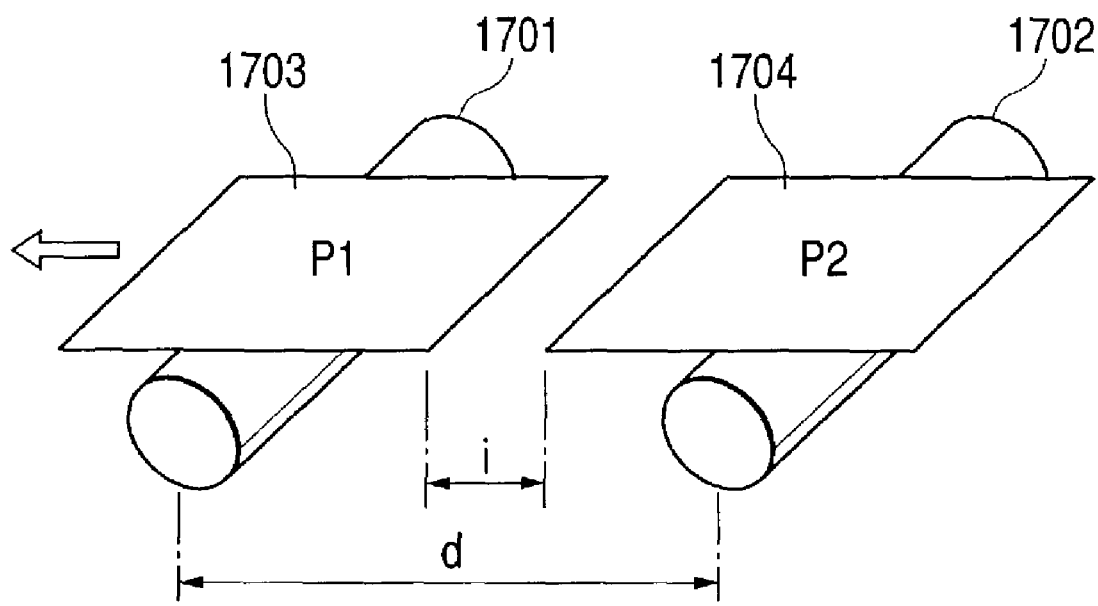
FIGS. 17A and 17B are diagrams showing the relations between photosensitive drums and image sizes.
Figure 17B:
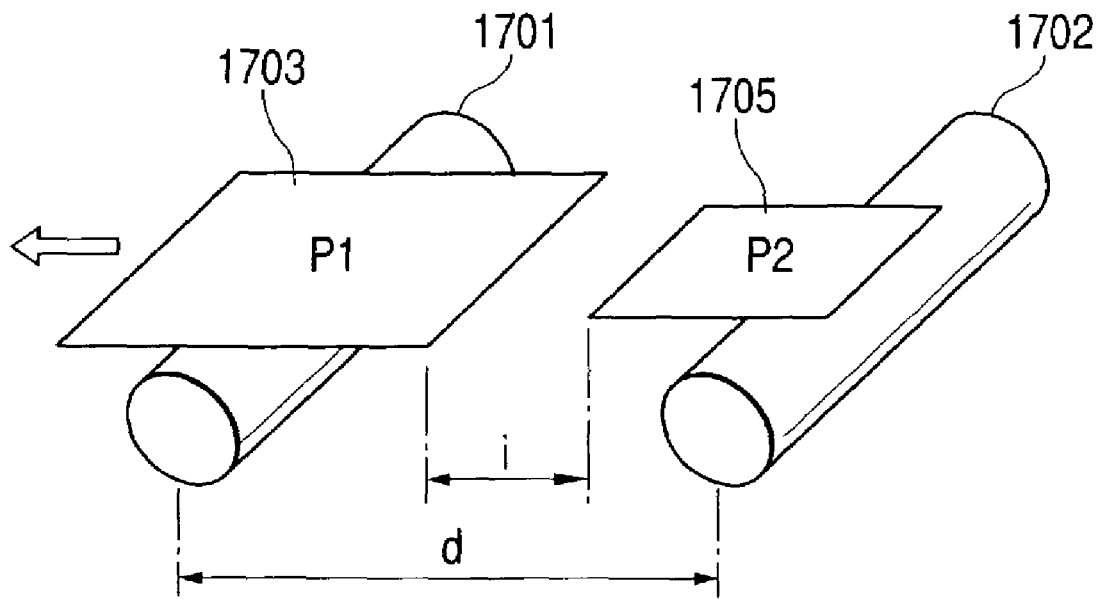

FIGS. 15 and 16 are timing charts showing changes of the control signals of the drum delay unit 704 in its sub scan direction. In FIGS. 15 and 16, symbol LINE ("0", "1", "2", . . . ) indicates the number of lines in the sub scan direction, and symbols page_wr and page_rd respectively denote counter data for administrating the pages in the data writing and the data reading. Here, the value of each of the data page_wr and page_rd is counted up like "0", "1", "2", "0", . . . for each page. However, in the example shown in FIG. 15, the value of the counter data is maintained as "0" because the number of pages is "1".

Moreover, symbols venb_rd_cntr0, venb_rd_cntr1 and venb_rd-cntr2 respectively denote up-and-down counter data for administrating the reading and writing operations in the sub scan direction corresponding to each counted value (page) of the counter data page_wr and page_rd. That is, each of the up-and-down counter data venb_rd_cntr0, venb_rd cntr1 and venb_rd_cntr2 is counted up for each line in the writing operation and counted down for each line in the reading operation.

For example, the up-and-down counter data venb_rd_cntr2 is counted up for each line when the data page_wr is "2" and the sub-scan valid interval signal venb_in is "0", and is counted down for each line when the data page_rd is "2" and the up-and-down counter data venb_rd_cntr2 is not "0".

Moreover, symbols ad_wr and ad_rd respectively denote counter data representing the writing address and the reading address which change for each line. That is, the value of each of the counter data ad_wr and ad_rd returns to "0" after it reaches the maximum value "9".

FIG. 15 shows a case where the length of the output image in its sub scan direction is longer than the drum interval, that is, the drum interval is equivalent to five lines and the length of the output image in the sub scan direction is equivalent to 16 lines. It should be noted that, although the number of lines of each of the length and the interval is set to be small for simplification of the explanation, the actual number of lines is more large.

At the line 0, if the sub-scan valid interval signal venb_in and the image data data_in are input, the up-and-down counter data venb_rd_cntr0 is counted up for each line when the sub-scan valid interval signal venb_in is "0" (i.e., the image data is input). Then, the up-and-down counter data venb_rd_cntr0 is counted up to the value "5" at the line 7.

Next, if the sub-scan activation signal pvsync_in of the printer is input, the sub-scan valid interval signal is set to "1". Moreover, the up-and-down counter data venb_rd_cntr0 is once counted up to the value "6" at the line 8, but is then counted down to the value "5" at the same line because the reading operation is performed.

After that, since the writing operation and the reading operation are simultaneously performed until the line 18, the up-and-down counter data venb_rd_cntr0 is counted up and down only to the values "6" and "5". Furthermore, since the writing operation ends at the line 19 (because any image data is not input), the up-and-down counter data venb_rd-cntr0 is counted down to the value "4" and then counted down until the value becomes "0" at the line 23. At the line 24 subsequent to the line where the value of the up-and-down counter data venb_rd_cntr0 became "0", the sub-scan valid interval signal venb_rd for the data reading is set to "0", and the reading operation ends.

FIG. 16 shows a case where the length of the output image in its sub scan direction is shorter than the drum interval and the length of the output image in its sub scan direction is different for each page. That is, the drum interval is equivalent to seven lines, and the length of the output image in the sub scan direction is equivalent to three lines at the first page, six lines at the second page, four lines at the third page, two lines at the fourth page, and second lines at the fifth page. It should be noted that, although the number of lines of each of the length and the interval is set to be small for simplification of the explanation, the actual number of lines is more large.

From the line 1 to the line 3, the image data of the first page is input, the value of the counter data page_wr is "0", and the up-and-down counter data venb_rd cntr0 is counted up to the value "3". Next, from the line 6 to the line 11, the image data of the second page is input, the counter data page_wr is counted up to the value "1", and also the up-and-down counter data venb_rd cntr1 is counted up to the value "6".

Then, the data reading of the first page starts from the line 8, the data page_rd is set to "0", and then the up-and-down counter data venb_rd-cntr0 is counted down. The obtained value becomes "0" at the line 10, and the sub-scan valid interval signal venb_rd for the data reading is set to "0" at the line 11, whereby the reading operation of the first page is stopped. Moreover, the data reading of the second page starts from the line 13, the data page_rd is counted up to the value "1", and then the up-and-down counter data venb_rd_cntr1 is counted down. Thus, the obtained value becomes "0" at the line 18, and the sub-scan valid interval signal venb_rd for the data reading is set to "0" at the line 19, whereby the reading operation of the second page is stopped.

From the line 14 to the line 17, the image data of the third page is input, the counter data page_wr is counted up to the value "2", and the up-and-down counter data venb_rd_cntr2 is counted up to the value "4". Next, from the line 20 to the line 21, the image data of the fourth page is input, the counter data page_wr is returned to the value "0", and also the up-and-down counter data venb_rd_cntr0 is counted up to the value "2". After then, similarly, the writing operation and the reading operation due to the data input are repeated.

As above, the sub-scan valid interval signal venb_in in the data reading is administrated on the basis of the three up-and-down counter data (venb_rd_cntr0, venb_rd_cntr1 and venb_rd_cntr2). Thus, even in the case where the length of the output image in its sub scan direction is shorter than the drum interval and the length of the output image in its sub scan direction is different for each page, it is possible to continue the recording operation without changing the memory control setting for each page. Thus, it is unnecessary to wait until the memory becomes vacant and also to prolong the sheet interval.

(Second Embodiment)

Figure 18:
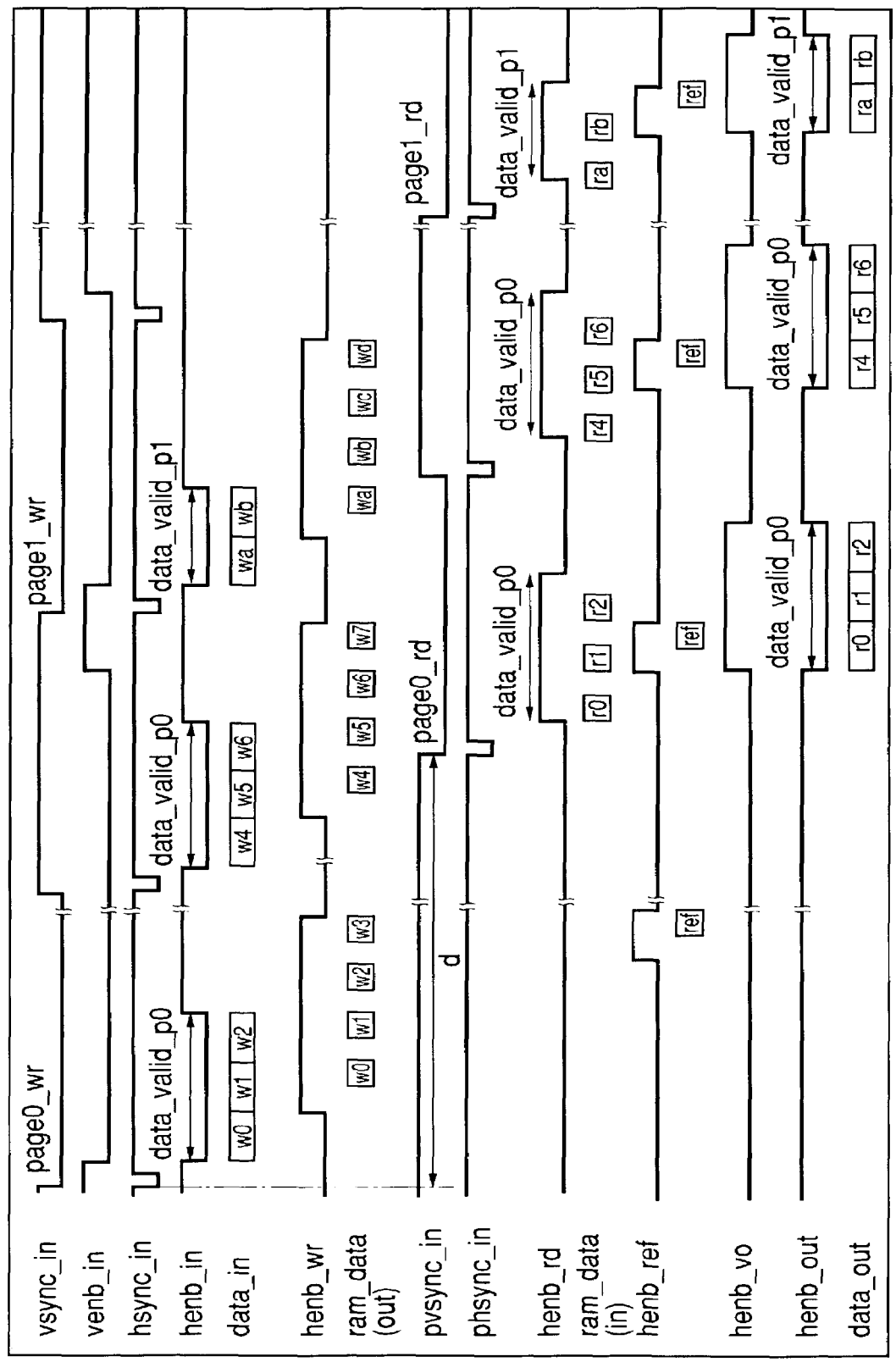
FIG. 18 is a timing chart showing changes of control signals of a drum delay unit 704 in its main scan direction, according to the second embodiment.

FIG. 18 is a timing chart showing changes of control signals of a drum delay unit 704 in its main scan direction, according to the second embodiment. It should be noted that output of 16-bit image data ram_data shown in FIG. 18 is different from that shown in FIG. 13.

Moreover, it should be noted that inputs of a sub-scan valid interval signal venb_in and four-bit image data data_in are the same as those shown in FIG. 13. The data are input for a main-scan valid interval (data_valid_p0) of the first page. In this interval, the data of 16 pixel clocks are temporarily stored as one block (data w0), and then the image data are collected into the block for every 16 clocks (data w1, data w2).

The temporarily stored image data w0, w1 and w2 are output as the data ram_data to an SDRAM 1205 in the interval of a main-scan valid interval signal henb_wr for the data writing, and the plural image data are stored in the SDRAM 1205. Here, as described above, the length of the main-scan valid interval (data_valid_p0) is stored in a main-scan valid interval holding unit 1201a. It should be noted that the main-scan valid interval signal henb_wr for the data writing is fixed to the maximum output image size. That is, if an A3 size is the maximum image size, the length of the main-scan valid interval signal henb_wr for the data writing is "7024". When the main-scan valid interval (data_valid_p0) is smaller than the main-scan valid interval signal henb_wr for the data writing, dummy image data fixed to "0" as data w3 of the image data ram_data is stored in the SDRAM 1205. Then, data w4, w5, w6 and w7 of next lines are similarly written in the SDRAM 1205.

With respect to the data of the second page, like the data of the first page, the main-scan valid interval signal henb_wr for the data writing is fixed to the maximum output image size, and dummy data wc and wd of the value "0" are written in the SDRAM.

Then, if a main-scan activation signal phsync_in is input from the printer, 16-bit image data r4 corresponding to the image data w4 of the first page is read from the SDRAM 1205 by controlling an address value, the read image data is converted into four-bit image data, and then the converted data is output as data data_out. After then, the processes same as those shown in FIG. 13 are preformed.

In the second embodiment, the length of the writing of the main-scan valid interval signal is always set to the maximum value of the image size, and only the length of the reading of the main-scan valid interval signal is administrated. However, it is thought that the lengths of the writing and the reading of the main-scan valid interval signal are always set respectively to the maximum values of the image size of the main-scan valid interval signal. In this case, since the reading control and the writing control for the main-scan interval are always the same, the control is simplified as a whole. Moreover, if it is set to write "0" as the dummy data to the data outside the valid area in the image data to be written in the memory according to need, unnecessary data is not output to the printer and the like. Thus, according to the present embodiment, although the accessing for reading or writing the data to the memory increases by the amount corresponding to the data outside the valid interval, it is unnecessary to administrate the length of the data in the main scan direction, whereby the control can be simplified.

(Third Embodiment)

In the first and second embodiments, the data writing and the data reading to and from the memory are controlled by storing and administrating the length of the data in the main scan direction or in the sub scan direction. On one hand, memory writing and reading can be controlled also by beforehand setting an end address representing the end of the memory writing for each page. For example, in a case where the data writing and the data reading of the main scan interval to and from a memory is always set to the maximum values of the image size, the following control is performed.

Figure 19:
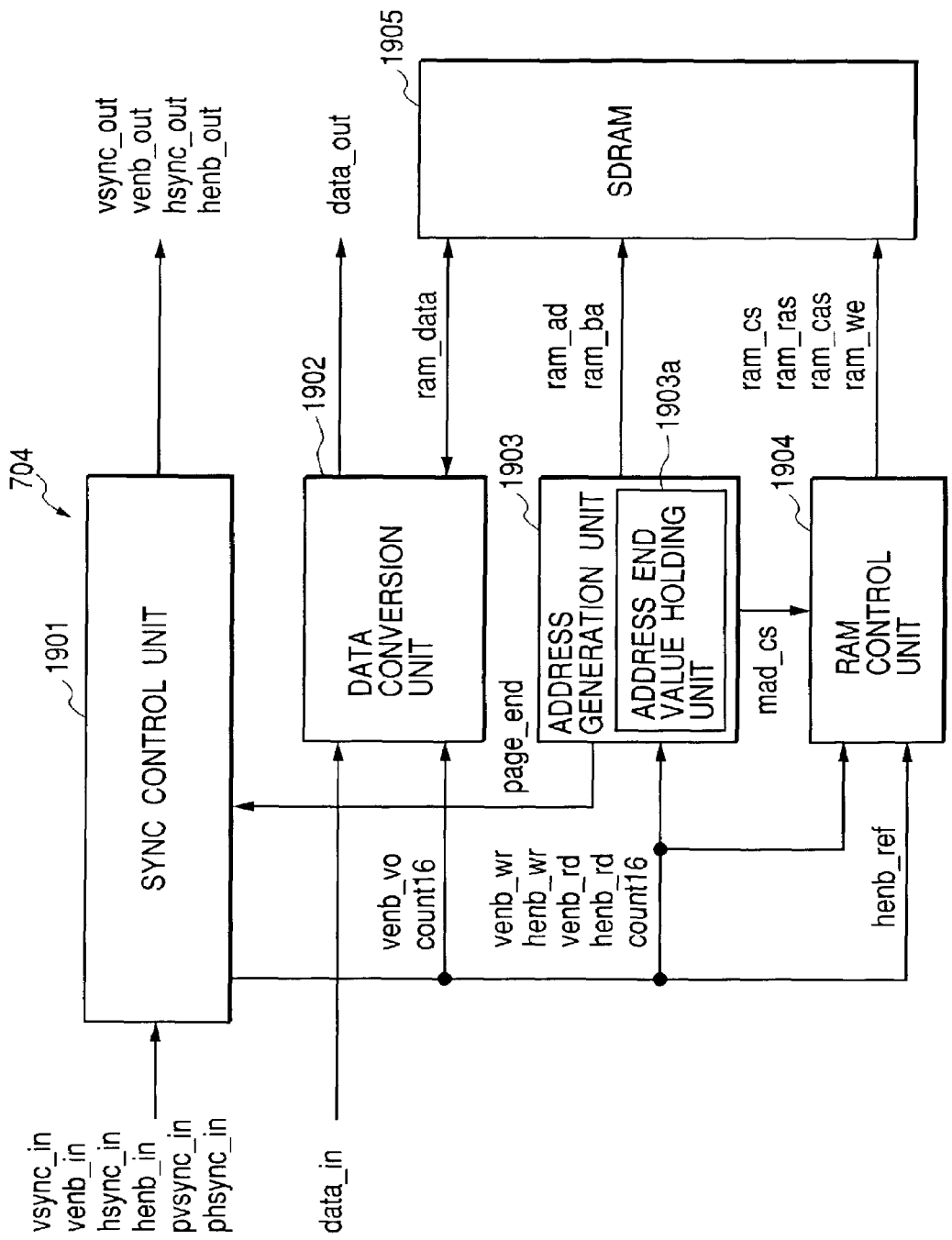
FIG. 19 is a block diagram showing the internal structure of a drum delay unit 704 according to the third embodiment.

FIG. 19 is a block diagram showing the internal structure of a drum delay unit 704 according to the third embodiment. In FIG. 19, numeral 1901 denotes a sync control unit which does not include a main-scan valid interval holding unit and a sub-scan valid interval holding unit as in the first embodiment. Numeral 1902 denotes a data conversion unit, and numeral 1903 denotes an address generation unit which includes an address end value holding unit 1903a for storing a last memory address of each page in the data writing. Here, it should be noted that the address end value holding unit 1903a can store the memory addresses of maximally three pages. Numeral 1904 denotes a RAM control unit, and numeral 1905 denotes an SDRAM acting as a delay memory.

As compared with FIG. 12, a page end signal page_end is newly added in the structure shown in FIG. 19. On the other hand, other sync signals are the same as those in FIG. 12. Incidentally, it should be noted that a sub-scan valid interval signal venb_rd for data reading becomes inactive when the page end signal page_end is output.

Four-bit image data data_in is input from a spatial filter 703 to the data conversion unit 1902, the input image data is temporarily stored as 16-bit data for every four pixels, the temporarily stored 16-bit image data is then transferred to the SDRAM 1905 at predetermined timing in response to a sync signal transferred from the sync control unit 1901, and the transferred image data is written in the SDRAM 1905. On the other hand, 16-bit image data read from the SDRAM 1905 is converted into four-bit image data of four pixels, and the obtained data is then output as data data_out.

The address generation unit 1903 generates a writing address and a reading address of the SDRAM 1905 in response to a control signal transferred from the sync control unit 1901. When a sub-scan valid interval signal venb_wr for the data writing and a main-scan valid interval signal henb_wr for the data writing both transferred from the sync control unit 1901 are active, the writing address is updated for every 16 cycles. The start value of the writing address of the first page is "0", and then the address when the sub-scan valid interval signal venb_wr for the data writing and the main-scan valid interval signal henb_wr for the data writing become inactive is held as the end address. Similarly, the end addresses of the second page and the third page are held. When the sub-scan valid interval signal venb_rd for the data reading and a main-scan valid interval signal henb_rd for the data reading are active, the reading address is updated for every 16 cycles. Also the start value of the reading address is "0", the page end signal page_end is output to the sync control unit 1901 when the value of the reading address becomes the address value held at a time of the data writing.

The respective addresses are converted into the address format suitable for the SDRAM 1905, and then output as an SDRAM address ram_ad and an SDRAM bank address ram_ba. Moreover, the address generation unit 1903 generates a signal mad_cs.

The RAM control unit 1904 generates a chip select signal ram_cs, an RAS signal ram_ras, a CAS signal ram_cas, and a writing signal ram_we which are necessary for command control of data reading and writing of the SDRAM 1905. Moreover, the RAM control unit 1904 generates a command control signal which is necessary for a refresh operation of the SDRAM 1905, in response to a main-scan valid interval signal henb_ref for refresh control of the SDRAM 1905.

FIG. 20 is a diagram simply showing an address map of the image delay memory according to the third embodiment. To simplify the explanation, it is shown in FIG. 20 that one address corresponds to one pixel. A length X of the image data in the main scan direction is fixed to the maximum value of the image size capable of being input, whereby the length X is always constant irrespective of the input data size. On the other hand, a length of the image data in the sub scan direction is given as Ya for the first page and as Yb for the second page, and the sum of the lengths Ya and Yb is smaller than a drum interval d.

First, if the image data of the first page is input, the writing address of the memory is counted up from the value "0", and then the writing address is further counted up by one every time the image data is input. At a time when all the data of the first page are written in the SDRAM 1905, the writing address of the memory has the value (X×Ya−1), and this address value is stored in the address end value holding unit 1903a as the end address value of the first page.

Next, if the image data of the second page is input, the writing address of the memory is counted up from the value (X×Ya), and then the writing address is further counted up in the same manner. At a time when all the data of the second page are written in the SDRAM 1905, the writing address of the memory has the value (X×Ya+X×Yb−1), and this address value is stored as the end address value of the second page.

Then, similarly, if a sub-scan activation signal pvsync_in of the printer is input while the writing address of the memory is being counted up, the data of the first page is counted up one by one from the reading address "0" of the memory as the data is being read from the SDRAM 1905. If the reading address of the memory is counted up until it reaches the end address (X×Ya−1) of the first page, the data reading of the first page ends. Then, if the next sub-scan activation signal pvsync_in of the printer is input, the memory reading operation is performed from the start value (X×Ya) of the reading address of the second page obtained by counting up the end address of the first page by one. Then, similarly, if the reading address of the memory is counted up until it reaches the value (X×Ya+X×Yb−1) of the end address of the second page, the data reading of the second page ends. Incidentally, when the reading address of the memory is counted up to the maximum value of the memory, the memory address is then returned to "0", and the above operations are repeated hereafter.

As above, the memory end address of each page is stored when the data writing is performed. Thus, even in the case where the length of the output image in its sub scan direction is shorter than the drum interval and the length of the output image in its sub scan direction is different for each page, the recording operation can be continued without changing memory control setting for each page. Therefore, it is unnecessary to wait until the memory becomes vacant and also to prolong the sheet interval.

In each of the above embodiments, as the situation that the length of the image in the main scan direction and the length of the image in the sub scan direction change during the continuous recording operations, there are following cases.

That is, there is the case where, when the plural originals are subjected to the copying by using the original feeder, the size is detected for each original when the original is actually fed, and the recording sheet is selected based on the detected size.

Further, there is the case where, in the state that the printer is connected to the network or the computer, the data of the different sheet sizes exist in one print job, or the sheet sizes are different between the successive two print jobs.

Furthermore, there is the case where the interruption printing of the different sheet sizes is performed to the running copying process or the running printing process.

In addition to these examples, the same situation occurs in a case where a FAX-received image is printed.

Therefore, the function to detect the size of each of the fed originals and automatically select the sheet on the basis of the detected size and the interruption printing function are provided in the MFP 104 of FIG. 1.

Although the above is the explanation of the embodiments of the present invention, the present invention is not limited to these embodiments. That is, the present invention is applicable to any structure capable of achieving the functions shown in the appended claims or the functions shown in the embodiments.

For example, in the above embodiments, the lengths of the main-scan valid interval signals of the three pages and the lengths of the sub-scan valid interval signals of the three pages are respectively administrated. However, it is possible to increase the number of pages more than the three pages. In this case, even if the drum interval is three times the length of the output image in the sub scan direction, the printer can be operated without any trouble. That is, it is possible to cope with a large-scale apparatus in which the drum interval is even wider or with a case where the sheet to be output is even smaller.

Moreover, in the above embodiments, the control to be performed to the delay memory on the basis of the length of the main scan valid interval and the length of the sub scan valid interval both administrated for each page in the drum delay unit is performed completely according to the hardware control. However, at least a part of the above control may be performed according to software control based on the CPU.

What is claimed is:

1. An image forming apparatus comprising:

plural image forming units arranged for respective color components at predetermined intervals;

a transportation unit arranged to transport recording sheets respectively to said plural image forming units;

a delay memory arrange to delay sending of image data for a time required to transport the recording sheet between said plural image forming units;

a length holding unit arrange to store, for each page, the length of one page of the image data for image formation in the main scan direction and the length of one page of the image data in the sub scan direction, the length of the image data in the main scan direction and the length of the image data in the sub scan direction stored in said length holding unit being determined for each page according to an image size of the image data, and the length of the image data in the main scan direction and the length of the image data in the sub scan direction determined for each page being stored in said length holding unit as much as plural pages;

a writing control unit arranged to control writing of the image data of plural successive pages into said delay memory on the basis of the length of the image data in the main scan direction and the length of the image data in the sub scan direction stored in said length holding unit; and a reading control unit arranged to control reading of the image data stored in said delay memory on the basis of the length of the image data in the main scan direction and the length of the image data in the sub scan direction stored in said length holding unit.

2. An image forming apparatus according to claim 1, wherein, in a case where the images of the plural pages are continuously formed by said plural image forming units, while the image data of a certain page is being read by said reading control unit, the image data of the page subsequent to the certain page is written in said delay memory.

3. An image forming apparatus according to claim 1, wherein said plural image forming units include a drum arrangement of cyan, magenta, yellow and black photosensitive drums, and said transportation unit transports the recording sheets at an interval shorter than the interval between the photosensitive drums at both ends of the drum arrangement.

* * * * *

UNITED STATES PATENT AND TRADEMARK OFFICE
CERTIFICATE OF CORRECTION

PATENT NO. : 7,224,481 B2  Page 1 of 1
APPLICATION NO. : 10/285459
DATED : May 29, 2007
INVENTOR(S) : Tsuji It is certified that error appears in the above-identified patent and that said Letters Patent is hereby corrected as shown below:

COLUMN 4:
Line 52, "out it," should read --it out,--.
Line 54, "out it." should read --it out.--.

COLUMN 13:
Line 41, ""17"." should read --"7"--.

COLUMN 14:
Line 23, "more large." should read --larger.--.
Line 55, "second" should read --two--.
Line 59, "more large." should read --larger.--.

COLUMN 19:
Line 15, "arrange" should read --arranged--.
Line 18, "arrange" should read --arranged--.

Signed and Sealed this

Third Day of March, 2009

JOHN DOLL
*Acting Director of the United States Patent and Trademark Office*